(12) United States Patent
Bishop et al.

(10) Patent No.: US 11,618,809 B2
(45) Date of Patent: *Apr. 4, 2023

(54) MULTIFUNCTIONAL NANOCOMPOSITES REINFORCED WITH IMPREGNATED CELLULAR CARBON NANOSTRUCTURES

(71) Applicant: Dickinson Corporation, Novato, CA (US)

(72) Inventors: Matthew Bishop, Novato, CA (US); David Andrew Brill, Novato, CA (US); Patrick Terrizzi, Novato, CA (US); Abhay V. Thomas, Novato, CA (US)

(73) Assignee: Dickinson Corporation, Novato, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/479,420

(22) PCT Filed: Jan. 19, 2018

(86) PCT No.: PCT/US2018/014549
§ 371 (c)(1),
(2) Date: Jul. 19, 2019

(87) PCT Pub. No.: WO2018/136810
PCT Pub. Date: Jul. 26, 2018

(65) Prior Publication Data
US 2021/0395467 A1    Dec. 23, 2021

Related U.S. Application Data

(60) Provisional application No. 62/448,129, filed on Jan. 19, 2017.

(51) Int. Cl.
C08K 3/04    (2006.01)
C09D 11/52   (2014.01)
(Continued)

(52) U.S. Cl.
CPC ............... C08K 3/04 (2013.01); C08F 10/00 (2013.01); C08G 59/18 (2013.01); C08J 3/07 (2013.01);
(Continued)

(58) Field of Classification Search
CPC ..................................... C08J 3/00; C08K 3/04
See application file for complete search history.

(56) References Cited

U.S. PATENT DOCUMENTS 4,832,870 A    5/1989   Clough et al.
6,811,881 B1   11/2004  Clough
(Continued)

FOREIGN PATENT DOCUMENTS

CN    101679605    3/2010
CN    101687646    3/2010
(Continued)

OTHER PUBLICATIONS

Huang, et al. ("Thickness of Graphene and Single-Wall Carbon Nanotubes", Physical Review, 74, 245413, 2006). (Year: 2006).*
(Continued)

*Primary Examiner* — Arrie L Reuther
(74) *Attorney, Agent, or Firm* — Calfee Halter & Griswold LLP

(57) ABSTRACT

The present disclosure is directed to multiphase dispersions and nanaocomposites comprised of continuous matrix or binder and endohedrally impregnated cellular carbon filler. These nanocomposites may exhibit superior mechanical, electrical, thermal, or other properties, and may be used in a variety of products, including hierarchical fiber-reinforced composites with nanocomposite matrices.

20 Claims, 24 Drawing Sheets

(51) Int. Cl.

| | |
|---|---|
| C08K 7/24 | (2006.01) |
| H01B 1/24 | (2006.01) |
| C08J 3/07 | (2006.01) |
| C08J 3/09 | (2006.01) |
| C08K 9/00 | (2006.01) |
| C08F 10/00 | (2006.01) |
| C08G 59/18 | (2006.01) |
| C08K 9/04 | (2006.01) |
| C09D 11/037 | (2014.01) |
| C09D 11/102 | (2014.01) |
| C09D 11/106 | (2014.01) |
| B82Y 30/00 | (2011.01) |

(52) U.S. Cl.
CPC ............ *C08J 3/095* (2013.01); *C08K 7/24* (2013.01); *C08K 9/00* (2013.01); *C08K 9/04* (2013.01); *C09D 11/037* (2013.01); *C09D 11/102* (2013.01); *C09D 11/106* (2013.01); *C09D 11/52* (2013.01); *H01B 1/24* (2013.01); *B82Y 30/00* (2013.01); *C08F 2810/00* (2013.01); *C08J 2363/00* (2013.01); *C08K 2201/001* (2013.01); *C08K 2201/003* (2013.01); *C08K 2201/011* (2013.01)

(56) References Cited

U.S. PATENT DOCUMENTS

| | | |
|---|---|---|
| 7,419,650 B2 | 9/2008 | Pierard et al. |
| 7,794,683 B1 | 9/2010 | Forohar et al. |
| 7,935,276 B2 | 5/2011 | Zhou |
| 8,828,533 B2 | 9/2014 | Dai et al. |
| 10,214,424 B2 | 2/2019 | Xu |
| 10,717,843 B2 | 7/2020 | Bishop et al. |
| 2004/0004212 A1 | 1/2004 | Crespi et al. |
| 2008/0275150 A1* | 11/2008 | Miller .......... C04B 35/522 521/80 |
| 2009/0220767 A1 | 9/2009 | Schlogl et al. |
| 2009/0294729 A1 | 12/2009 | Harada et al. |
| 2010/0178399 A1 | 7/2010 | Square et al. |
| 2011/0278506 A1 | 11/2011 | Toyokawa |
| 2012/0027681 A1 | 2/2012 | Jung |
| 2012/0241688 A1 | 9/2012 | Hara et al. |
| 2013/0181676 A1 | 7/2013 | Kourtakis et al. |
| 2013/0214875 A1 | 8/2013 | Duncan et al. |
| 2014/0141224 A1* | 5/2014 | Pasquali .......... C04B 41/88 428/219 |
| 2014/0275597 A1 | 9/2014 | Zhang et al. |
| 2014/0286852 A1 | 9/2014 | Nicholas et al. |
| 2015/0067707 A1 | 3/2015 | Chin et al. |
| 2016/0096334 A1 | 4/2016 | Sander |
| 2016/0236177 A1 | 8/2016 | Backov |
| 2017/0008769 A1 | 1/2017 | Otter et al. |
| 2018/0105422 A1 | 4/2018 | Chengzhang |
| 2018/0223073 A1 | 8/2018 | Bishop et al. |
| 2020/0131040 A1 | 4/2020 | Bishop et al. |
| 2020/0346934 A1 | 11/2020 | Thomas et al. |
| 2021/0214520 A1 | 7/2021 | Bishop et al. |

FOREIGN PATENT DOCUMENTS

| | | |
|---|---|---|
| CN | 101304945 A | 1/2015 |
| CN | 104269543 A | 1/2015 |
| FR | 1087068 A | 2/1955 |
| JP | 2008535763 A | 4/2006 |
| JP | 2009132607 A | 6/2009 |
| JP | 2009-538363 | 11/2009 |
| JP | 2010-007067 | 1/2010 |
| JP | 20107061 A | 1/2010 |
| JP | 2011525468 A | 9/2011 |
| JP | 2012-201689 | 10/2012 |
| JP | 2013-166849 | 8/2013 |
| NZ | 338047 A | 8/2001 |
| WO | 2006108683 A1 | 4/2006 |
| WO | 2007143237 A2 | 12/2007 |
| WO | 2009149540 A1 | 5/2009 |
| WO | 2012174040 A1 | 12/2012 |
| WO | 2014026194 A1 | 2/2014 |
| WO | 2016208170 A | 6/2016 |
| WO | 2019149540 A1 | 8/2019 |
| WO | 2021257566 A1 | 12/2021 |

OTHER PUBLICATIONS

Ariga, "Nanoarchitectonics for Mesoporous Materials", Bulletin of the Chemical Society of Japan, vol. 85, No. 1, 1-32, Jan. 2012.

Dittanet, Preerapan, "Fracture Behavior of Silica Nanoparticle Filled Epoxy Resisn" (2011). Theses and Dissertations. Paper 1034.

Garlof, Svenja, "Electro-mechanical piezoresistive properties of three dimensionally interconnected carbon aerogel (Aerographite)-epoxy composites", Composites Science and Technology 134 (2016) 226-233.

Son, In Hyuk, "Silicon carbide-free graphene growth on silicon for lithium-ion battery with high volumetric energy density", Nature Communications, Jun. 25, 2015.

"XGnp Graphene nanoplatelets—Grade C", XGSciences, 2 pages.

Hodkiewica, Joe, "Characterizing Graphene with Raman Spectroscopy", Thermo Scientific, Application Note: 51946, 2010.

Garlof, Svenja, "3D carbon networks and their polymer composites: Fabrication and electromechanical investigations of neat Aerographite and Aerographite-based PNCs under compressive load", Carbon 111, Sep. 20, 2016, pp. 103-112.

Guo, Chun Xian, "A self-assembled hierarchical nanostructure comprising carbon spheres and graphene nanosheets for enhanced supercapacitor preformance", Energy & Enviromental Science, 2011, pp. 4504-0407.

Mecklenburg, Matthias, "Aerographite: Ultra Lightweight, Flexible Nanowall, Carbon Microtube Material with Outstanding Mechanical Performance", Advanced Materials, 2012, 24, 3486-3490.

Mortazavi, Bohayra, "Amorphized graphene: A stiff material with low thermal conductivity", Carbon 103, 2016, pp. 318-326.

Castillejos, Eva, "An Efficient Strategy to Drive Nanoparticles into Carbon Nanotubes and the Remarkable Effect of Confinement on Their Catalytic Performance", Angewandte Chemie, 2009, 48, 2529-2533.

Lee, Ki Rak, "Electrochemical oxygen reduction on nitrogen doped graphene sheets in acid media" Electrochemistry Communications 12, 2010, pp. 1052-1055.

Gojny, Florian H., "Functionalisation effect on the thermo-mechanical behaviour of multi-wall carbon nantube/epoxy-composites", Composites Science and Technology 64, 2004, pp. 2303-2308.

Cheng, Qian, "Graphene and carbon nanotube composite electrodes for supercapacitors with ultra-high energy density", Phys. Chem. Chem Phys., 2011, 13, pp. 17615-17624.

Tuan, Dinh Van, "Insulating behavior of an amorphous graphene membrane", Physical Review B86, 121408(R), 2012.

Carpenter, Corinne, "Mechanical properties of irradiated single-layer graphene", Appl. Phys. Lett. 103, 013102, 2013.

Choi, Young-Kuk, "Processing and characterization of epoxy nanocomposites reinforced by cup-stacked carbon nanotubes", Polymer 46, 2005, pp. 11489-11498.

Vilian, A.T. Ezhil, "Pt-Au bimetallic nanoparticles decorated on reduced graphene oxide as an excellent electrocatalysts for methanol oxidation", Synthetic metals 219, 2016, pp. 52-59.

Cheng, Hui-Ming, "Shortened double-walled carbon nanotubes by high-energy ball milling", International Journal of Nanotechnology, Jan. 2007.

Wang, Guoxiu, "Sn/graphene nanocomposite with 3D architecture for enhanced reversible lithium storage in lithium ion batteries", Journal of Materials Chemistry, 2009, 19, pp. 8378-8384.

Wagner, Daniel Hanoch, "Stress-Induced Fragmentation of Multi-Walled Carbon Nanotubes in a Polymer Matrix", Applied Physics Letters, Jan. 1998.

Office action from Indian Application No. 201947033290 dated Mar. 23, 2021.

(56) References Cited

OTHER PUBLICATIONS

Da Silveria, et al., "Functionalized Cellular Carbon-MgO Composites: From Interface Processing to Thermal Shock Resistant Low-Carbon MgO-C Refractories," Advanced Engineering Materials, DOI: 10.1002/adem.201300052, vol. 16, No. 3, XP055467219, pp. 301-308, (Oct. 17, 2013).

Da Silveria, et al., "Reinforced Celular Carbon Matrix-MgO Composites for High Temperature Applications: Microstructural Aspects and Collodial Processing", Advanced Engineering Materials, DOI: 10.1002/adem.201100028, vol. 13, No. 11, XP055467221, pp. 982-989, (May 27, 2011).

International Search Report and Written Opinion for International Application No. PCT/US2018/014549 dated Jul. 6, 2018.

Office action from Japanese Application No. 2019-560047 dated Dec. 21, 2021.

An et al. "Polypyrolle/Carbon aerogel composite materials for supercapacitator", Journal of Power Sources, vol. 195, No. 19, Oct. 1, 2010, pp. 6964-6969.

"Chemical vapor infiltration", Wikipedia, 2020, p. 1-5, https://en.wikipedia.org/wiki/windexphp?title=Chemical_vapor_infilitration&oldid=944760299.

Farbos et al. "Nanoscale Structure and texture of highly anisotropic pyrocarbons revisited with transmission electron microscopy, image processing, neutron diffraction and atomistic modeling", Carbon, vol. 80, Sep. 4, 2014, p. 472-489.

Hsieh et al., Mechanical properties and toughness of carbon aerogel/epoxy polymer composites, Springer Science +Business Media, vol. 50, pp. 3258-3266, 2015.

International Search Report and Written Opinion from PCT/US2018/057082 dated Dec. 31, 2018.

International Search Report and Written Opinion from PCT/US21/37435 dated Sep. 28, 2021.

Oberlin, "Pyrocarbons", Carbon, vol. 40, No. 7, Nov. 2001, p. 7-24.

Office action from Indian Application No. 201947041276 dated Mar. 24, 2021.

Office action from Japanese Application No. 2019-550644 dated Dec. 21, 2021.

Office Action from Chinese Application No. 201880019586.2 dated Sep. 1, 2021.

Search Report from European Application No. 18871140.2 dated Jun. 21, 2021.

Zhang et al. "Mussel-Inspired Polydopamine Coated Hollow Carbon Microspheres, a Novel Versatile Filler for Fabrication of High Performance Syntactic Foams", ACS Applied Materials & Interfaces, vol. 6, No. 21, Oct. 15, 2014, p. 18644-18652.

Davydov et al., Preparation of a Platelike Carbon Nanomaterial Using MgO As a Template; Neorganicheskie Materialy, 2012, vol. 48, No. 3, pp. 297-301.

Llu "Graphene-like nanoribbons periodically embedded with four- and eight-membered rings." Nature Comm, 8:14924, pp. 1-7 (Year:2017).

Negishi et al.," Layer-by-Layer Growth of Graphene Layers on Graphene Substrates by Chemical Vapor Deposition," Thin Solid Films, vol. 519 (2011), pp. 6447-6452.

\* cited by examiner

MULTIFUNCTIONAL NANOCOMPOSITES REINFORCED WITH IMPREGNATED CELLULAR CARBON NANOSTRUCTURES

CROSS-REFERENCE TO RELATED APPLICATIONS

This application claims priority to U.S. Provisional Patent Application Ser. No. 62/448,129 filed Jan. 19, 2017, which is hereby incorporated by reference in its entirety for all purposes.

FIELD OF DISCLOSURE

This disclosure relates to a novel class of liquid dispersions and solid nanocomposites comprised of endohedrally impregnated cellular carbon nanostructures in liquid or solid matrices.

BACKGROUND

In recent years, polymer nanocomposites filled with $sp^2$-hybridized carbons have been studied extensively. $Sp^2$ carbons can be classified based on their dimensions and geometries. So-called zero-dimensional carbon nanostructures include buckminsterfullerenes and carbon quantum dots. One-dimensional carbon nanostructures include carbon nanotubes and nanofibers, all of which may share a linear, nanostructured morphology. Two-dimensional carbons include single-layer graphene and multilayer graphitic nanoplatelets. These are often produced from a bulk graphite precursor using liquid-phase exfoliation processes like Hummers' Method. Bulk graphitic structures such as carbon fibers or powders comprise the three-dimensional family of $sp^2$ carbons.

While low-dimensional carbons such as nanotubes and graphene nanoplatelets possess impressive mechanical, thermal, and electrical properties, their low-dimensionality also makes them difficult to use in composite applications. Van der Waals interactions between their surfaces cause carbon nanoparticles to adhere to one another and self-assemble into disordered clusters when blended into liquid matrices ("matrix" is herein defined as a continuous liquid or solid phase surrounding the carbon nanoparticles). Carbon clusters, or "agglomerates," reflect the tendency of low-dimensional carbons to revert to a surface energy-minimized, three-dimensional form when blended into a matrix. The effect can phase-separate the matrix and filler and degrade composite performance. To combat this phase separation, researchers have introduced "spacer" particles between graphene particles [1-3]. While spacers do not prevent agglomeration, per se, they do limit the density of the agglomerates and the occlusion of the carbon's surface area by disallowing efficient interparticle adhesion. Without spacers, nanoplatelets can agglomerate densely due to their geometry, as illustrated in FIG. 1A, which shows a cross-sectional representation of nanoplatelets and how both sides of the nanoplatelets are accessible to adhere to other nanoplatelets to form a spatially dense, low surface-area cluster.

Porous carbon nanostructures provide a promising alternative that has both two-dimensional and three-dimensional properties. Examples of such materials in the literature include ordered mesoporous carbons (OMCs) and "3D graphene." In the case of OMC particles, researchers value the highly ordered, nanoarchitected morphologies that can be obtained due to template-directed synthesis [4]. A feature of OMCs is that the combination of their endohedral pore structure ("endohedral" herein refers to an internal cavity or surface in the carbon created by a template, while "exohedral" refers to the carbon structure's obverse surface) and their nanostructured walls allows for high specific surface areas, and their surface areas are retained so long as the endohedral surfaces are not occluded due to collapse of the endohedral pores. The spacing imposed by endohedral pores can provide a solution to the problems of nanotubes and nanoplatelets in liquids. Unfortunately, the pores are smaller than 10 nm for many OMC variants, resulting in a low pore-to-wall diametric ratio. Compared to carbons with larger endohedral cavities, OMCs can be spatially dense and difficult to impregnate and wet internally. Current research into applications for OMCs is mostly focused on adsorption and energy storage.

Some 3D nanocarbons contain larger endohedral cavities, which can theoretically be used to create a superior nanocomposite architecture. One prominent example has been obtained with aerographite, an interconnected tubular carbon network possessing nanostructured walls. As described by Garlof, et al., aerographite exhibits a "high potential for improved electrical conductivity and mechanical reinforcement of polymer nanocomposites. The incorporation of 3D nanocarbons in a polymer matrix can circumvent several drawbacks in contrast to the use of dispersed carbon nanoparticles, like agglomeration and lack of controlled network topology, hence 'ideal' composites can be created" [5]. Specifically, Garlof describes aerographite as a monolithic preform into which liquid epoxy resin can be infused endohedrally and exohedrally via vacuum-impregnation. The interconnectedness of the network is "the common structural motive of the Aerographite family," according to Mecklenburg, due to its ability to support itself and, in conductive polymer nanocomposites, to serve as a highly diffuse, percolative skeleton [6].

Like OMCs, uncollapsed aerographite specimens impose spacing between nanostructured features. However, an interconnected and continuous carbon structure may have drawbacks. Effective infusion and wetting of highly porous, continuously interconnected carbon monoliths may require low-viscosity thermosetting resins and vacuum infusion processes, and this may introduce complexity into nanocomposite fabrication-especially fabrication of thick nanocomposite components. Additionally, while a fluid dispersion can be integrated with fibrous reinforcement and fabricated using conventional tooling and manufacturing processes, continuously interconnected carbons may be less immediately practical for fabricating thick molded components, or thinly applied adhesives and coatings. Flowable liquid dispersions of discontinuous carbon nanoparticles are desirable for many nanocomposite applications.

The present invention pertains to, among other things, multiphase materials comprised of a continuous phase filled with a class of porous, 3D carbon nanostructures that offer the practical advantages of a discontinuous filler phase with a cellular morphology. These cell structures possess larger endohedral cavities than most CMK-type OMCs. Their template-directed cavity and wall morphology can allow cell particles to be made with highly regular size and shape distributions. Breaches in their cell walls may allow for infiltration of the polymer matrix material. This can result in an endohedrally impregnated cellular subunit that can self-assemble with other such subunits via van der Waals interactions into a spatially diffuse, multicellular, multiphase network with morphologically imposed phase-mixing.

For illustrative purposes, FIG. 1B shows a two-dimensional representation of a hypothetical spherical cell. The cell is a discontinuous particle. FIG. 1C is a two-dimensional representation of the spatially diffuse network created by a self-assembled cluster of these hypothetical cell particles. Because the filler is discontinuous, nanocomposites filled with this class of carbons (herein referred to collectively as "cellular carbons" or "cellular carbon structures" and individually as a "cell" or "cell structure") can be dispersed into liquid resins, facilitating the fabrication of components requiring flowable precursors. Compared to other carbons, cellular carbons and their derivatives may provide larger, less elongated cavities, nanostructured walls, template-directed geometries and topographies, and a discontinuous form factor.

SUMMARY

Described herein is a novel class of multiphase dispersions and nanocomposites comprised of a continuous, matrix phase and a discontinuous phase of endohedrally impregnated cellular carbon nanostructures. The matrix may consist of one or more thermosetting or thermoplastic polymers, pre-polymers, resins, monomers, solvents, or mixtures thereof. The cellular carbons may be dispersed throughout the matrix as individual particles or clusters of particles, and may be covalently or noncovalently chemically functionalized. The cellular carbons may be endohedrally impregnated with a liquid or solid filler and may be substantially without endohedral voids. In addition to the cellular carbons, other fillers or reinforcements, such as fibrous reinforcements, may be co-dispersed into the matrix. Polymer nanocomposite embodiments may exist in various states of cure, including uncured, partially cured or "B-stage" cured, and completely cured. Matrices may be solids, liquids, or gels at room temperature without limiting the applicability of the invention.

One object of the present invention is to create polymer nanocomposites with enhanced mechanical and conductivity properties due to the effects of a novel, cellular carbon phase. Another object of the present invention is to create nanocomposites that may be used in a wide variety of formulated inks, coatings, paints, sealants, adhesives, molded plastics, foams, fiber-reinforced composites, and other polymer applications.

The nanocomposites described herein offer advantages over the prior art. Cellular carbons may be able to resist the formation of spatially dense agglomerates in liquids, a problem with low-dimensional carbons. They can possess endohedral surfaces that are accessible to be wetted by matrix fluids, but are geometrically disallowed from adhering to neighboring particles. Cellular carbon derivatives, such as curved fragments, also may possess non-planar convex or concave surfaces that reduce the efficiency of interparticle adhesion. Unlike nanocomposites made with other porous nanostructured carbon networks such as aerographite, nanocomposites filled with dispersed cellular carbons may not require preforms and may be easier to fabricate into various components.

Additional advantages and applications will be readily apparent to those skilled in the art from the following detailed description. The examples and descriptions herein are to be regarded as illustrative in nature and not restrictive.

BRIEF DESCRIPTION OF THE FIGURES

Exemplary embodiments are described with reference to the accompanying figures, in which.

DETAILED DESCRIPTION

Cellular carbons constitute a subset of a broad class of porous $sp^2$-hybridized carbon structures. Because of their morphological diversity, as well as the diversity of non-cellular porous carbons, we first enumerate a consistent and meaningful set of properties that taxonomically differentiate cellular carbons from other carbons that may be similar in one or more specific ways, but which are different when viewed holistically. The broader class of porous, $sp^2$-hybridized carbon structures includes, but is not limited to, single-wall nanotubes, multi-wall nanotubes, carbon microtubes, fullerenes, petroleum cokes, chars, ordered mesoporous carbons, carbon cenospheres, graphene aerogels, folded or crumpled graphene nanoplatelets, cup-stacked nanotubes or hollow carbon nanofibers, porous carbon fibers, etc.

Figure 1A:
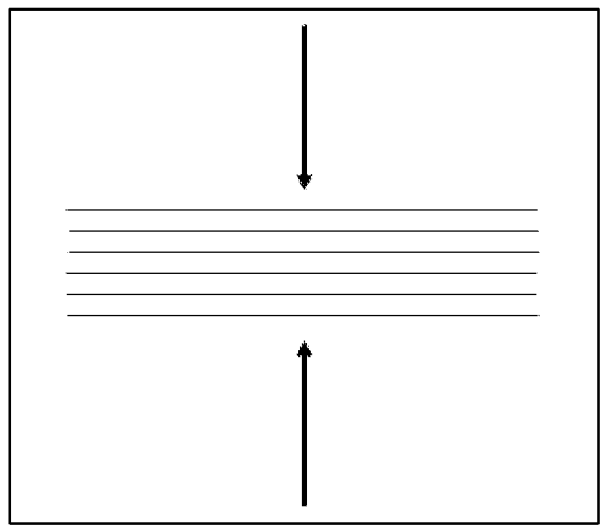
FIG. 1A is a two-dimensional, cross-sectional representation of a nanoplatelets, which possesses two accessible sides that may interact with and adhere to other particles, resulting in spatially dense clustering or stacking and surface occlusion.
Figure 1B:
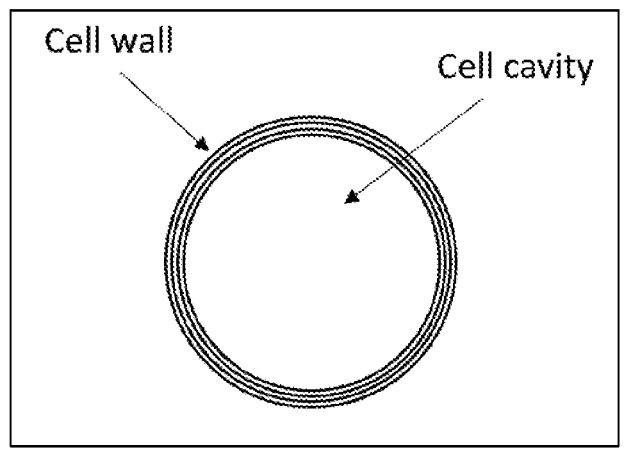
FIG. 1B is a two-dimensional, cross-sectional representation of a hypothetical spherical cell particle.
Figure 1C:
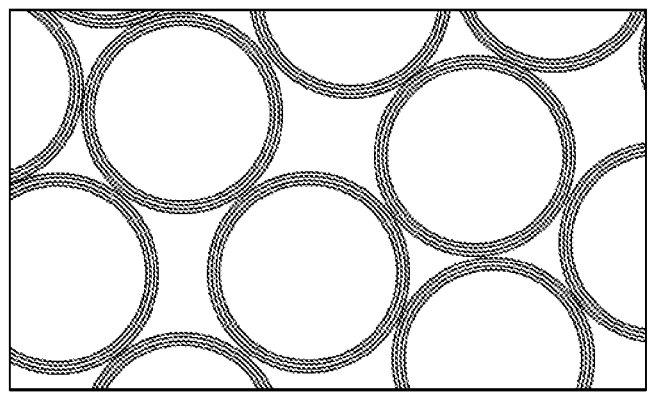
FIG. 1C is a two-dimensional representation of the spatially diffuse network formed by a self-assembled cluster of spherical cells. This spatial diffusion is a result of internal cavities and surfaces that are inaccessible.
Figure 2:
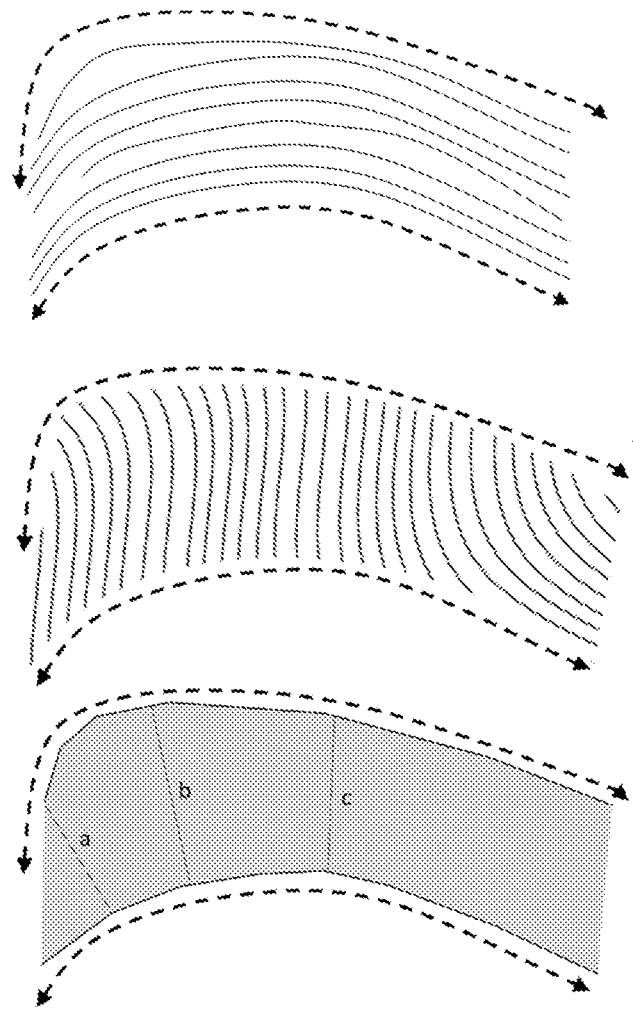
FIG. 2 illustrates how cell walls may be comprised of carbon lattices (indicated by solid lines) in different orientations with respect to the orientation of the wall (indicated by dotted lines with arrows). The first representation illustrates a wall architecture in which the carbon lattices are oriented more or less in the same plane as the wall's orientation. The second representation illustrates a wall architecture in which the carbon lattices have complex orientations. Both representations illustrate how interlayer spacing may vary. The third representation illustrates how the wall thickness at different points may be measured by drawing a chord that is reasonably orthogonal to the cell wall at the point of measurement.
Figure 3:
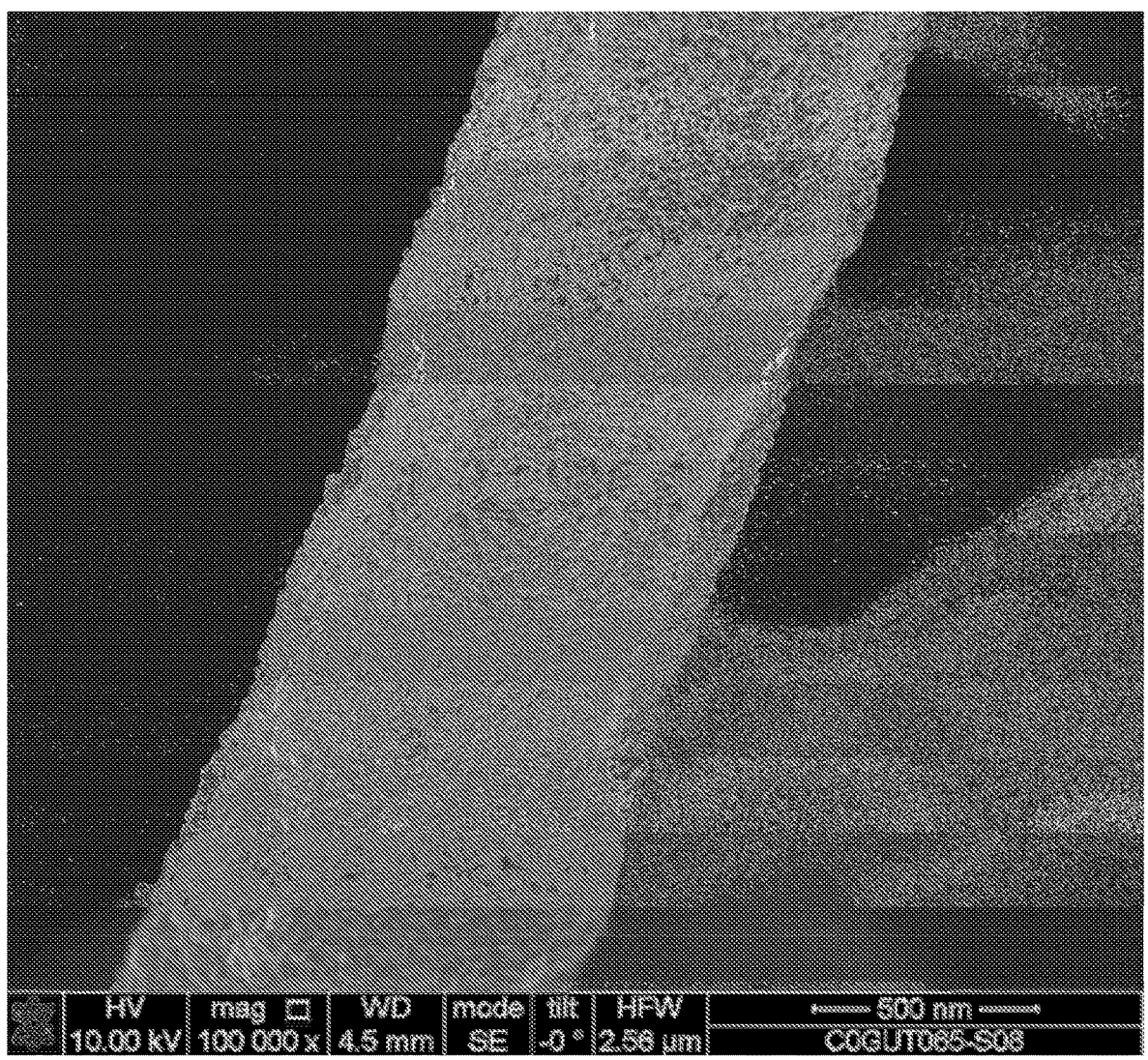
FIG. 3 is an SEM micrograph of a fibrous, nano-architected cellular carbon structure comprised of numerous smaller cells. While the microstructure of the fibroid itself is larger than 100 nm in every dimension, its features are all still nanostructured in composition, since their bulk phases are all thinner than 100 nm.

Cellular carbons vary from one another based on cavity size and shape, thickness of bulk features, and particle geometry, and also based on the distributional properties of populations comprised of these particles. These features determine their suitability for various applications. We define cellular carbons as those exhibiting at least some of the following criteria:

1. A cellular carbon's bulk phases are typically nanostructured, i.e., comprised of features that are, on average, smaller than 100 nm along at least one axis of measurement. The bulk phase of an individual cell is its cell wall, the thickness of which may be measured along a chord drawn substantially orthogonal to the wall at the point of measurement, as illustrated in FIG. 2. In multicellular particles, adjoined cell walls form a combined bulk phase that is also nanostructured. Cellular carbons, while nanostructured, may also be microstructured, as exemplified by the cellular microfiber in FIG. 3, which has a continuous, multicellular microstructure, but no bulk phases thicker than 100 nm.

Figure 4:
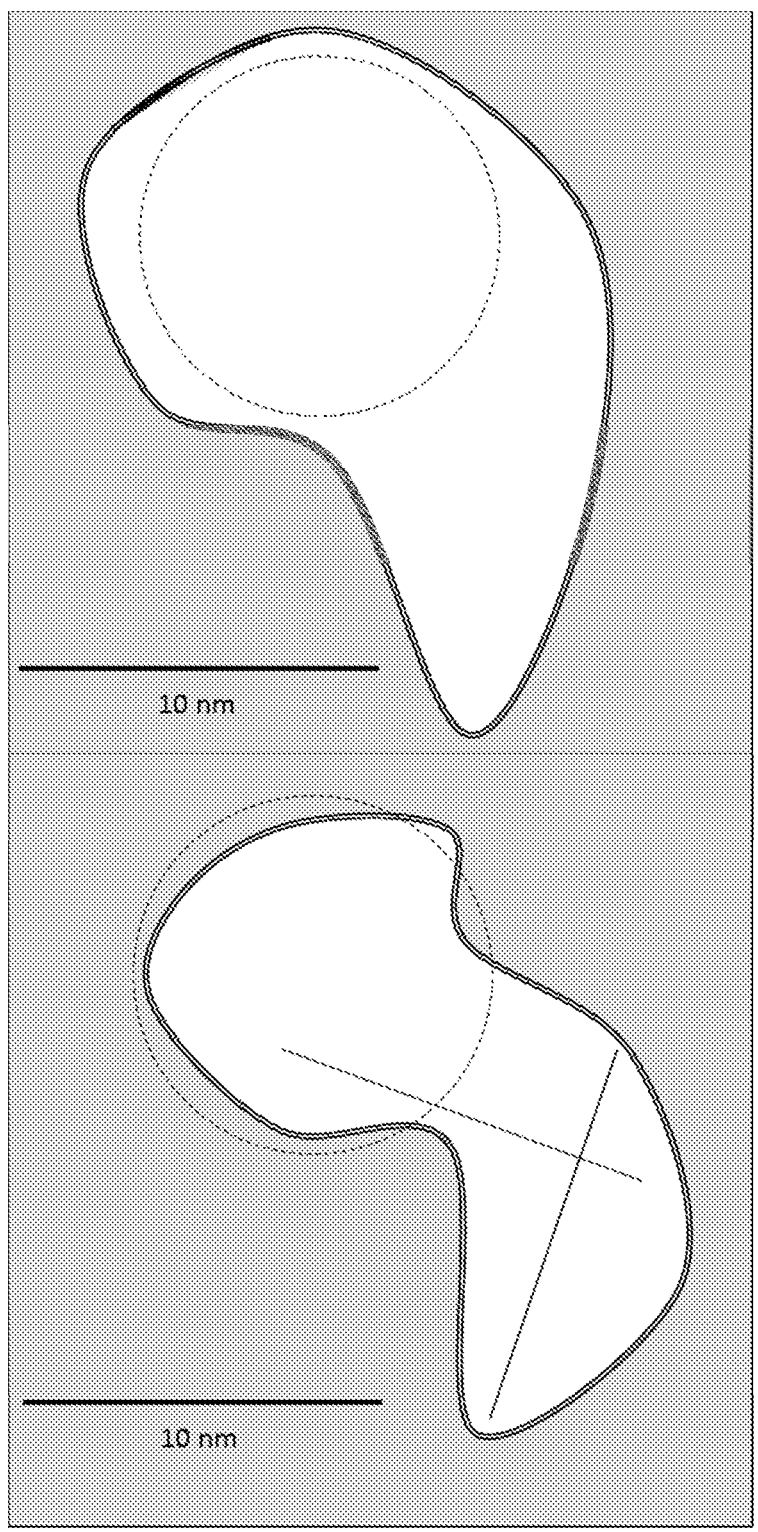
FIG. 4 is an illustration of two hypothetical cellular carbon structures, represented two-dimensionally. A thin cell wall is represented by the double black lines. The outside of the cell is the light grey region. The endohedral cavity is the white region. A scale bar in the bottom left provides a 10 nm length for reference. In the top structure, a 10 nm diameter circle can be drawn completely within the cavity, as shown by the dotted reference circle. In the bottom structure, a 10 nm diameter circle cannot be drawn completely within the cavity, but two orthogonal chords measuring 10 nm or larger can be drawn within the cavity, as shown by the two perpendicular segments of 10 nm length.
Figure 5:
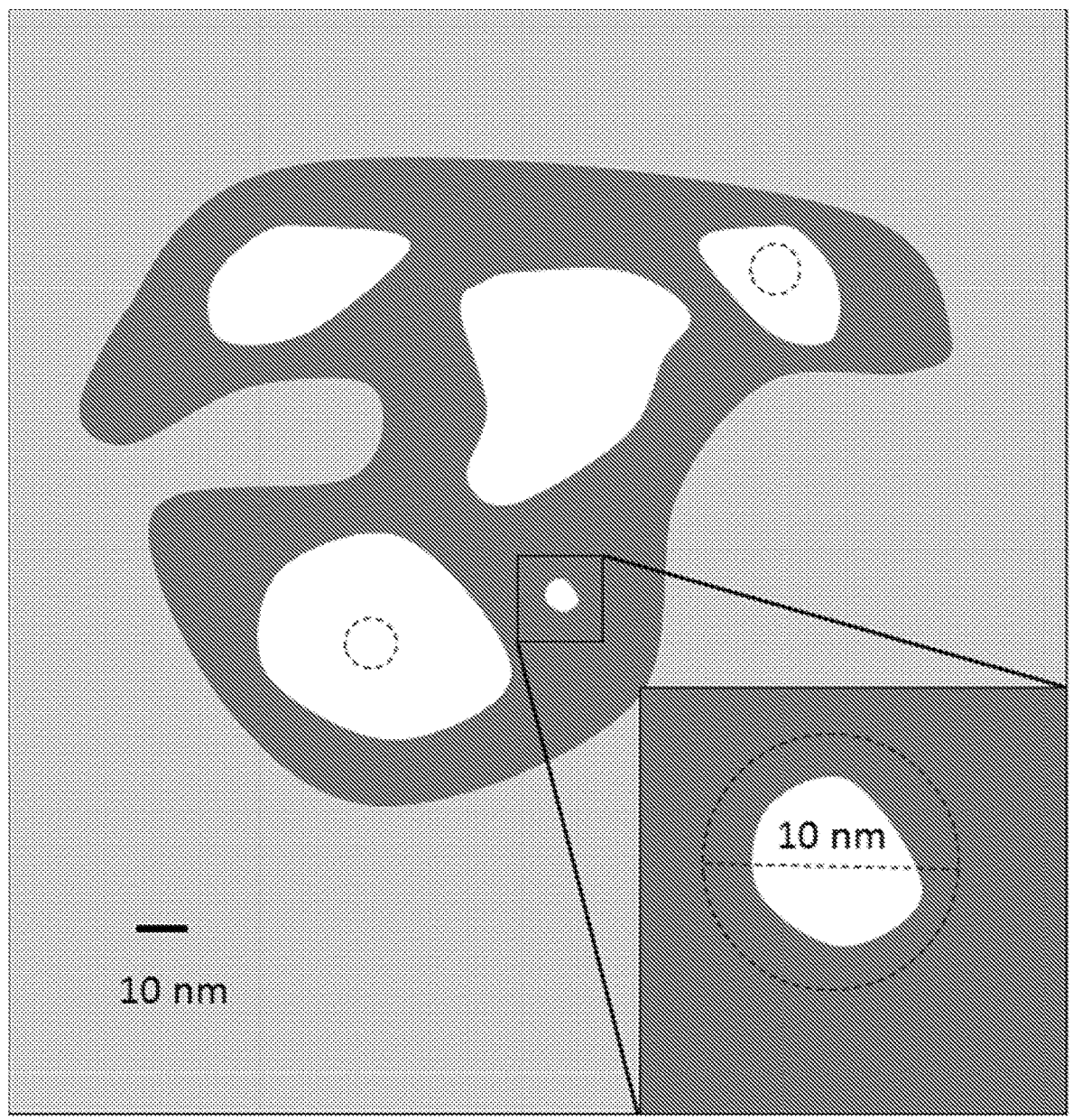
FIG. 5 is an illustration of a hypothetical cellular structure containing multiple cavities. A thick cell wall is represented by the dark grey region. The outside of the cell is the light grey region. The cavities inside the cell are the white regions. A scale bar in the bottom left provides a 10 nm length for reference. The majority of the cavities in this hypothetical structure are larger than 10 nm, as indicated by the two dotted reference circles, both drawn with 10 nm diameters. However, one of the cavities, as indicated by the magnified inset, is smaller than 10 nm in every direction, as shown by its complete containment within a 10 nm diameter reference circle.
Figure 6:
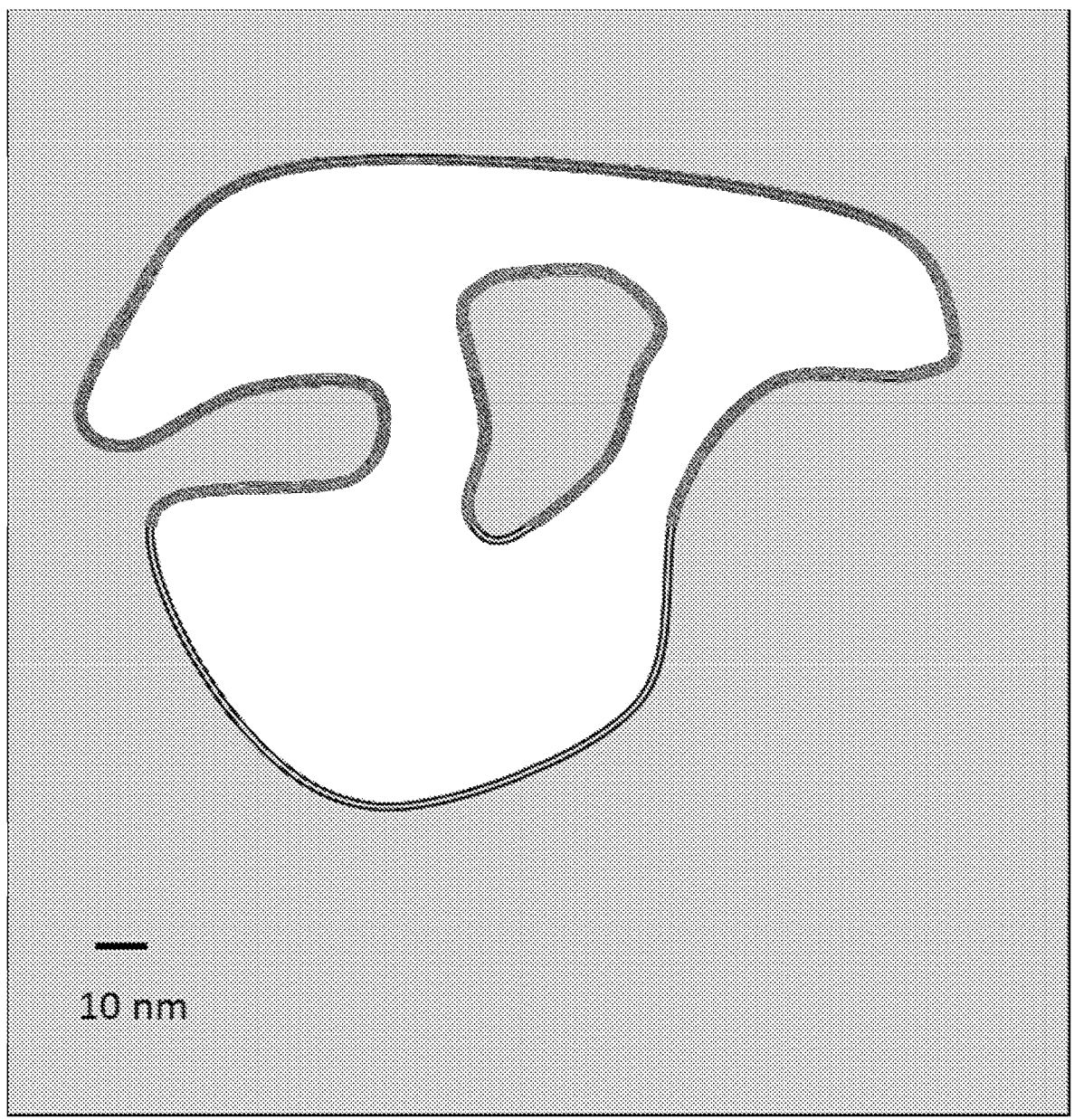
FIG. 6 is an illustration of a hypothetical, lobular cellular structure containing one exohedral hole. A thin cell wall is represented by the double black lines. The outside of the cell is the light grey region. The endohedral cavity is the white region. A scale bar in the bottom left provides a 10 nm length for reference. As this illustration shows, the presence of exohedral holes increases the complexity of the cavity morphology by creating local cavity features. In this illustration, the local cavity diameter is universally larger than 10 nm.
Figure 7:
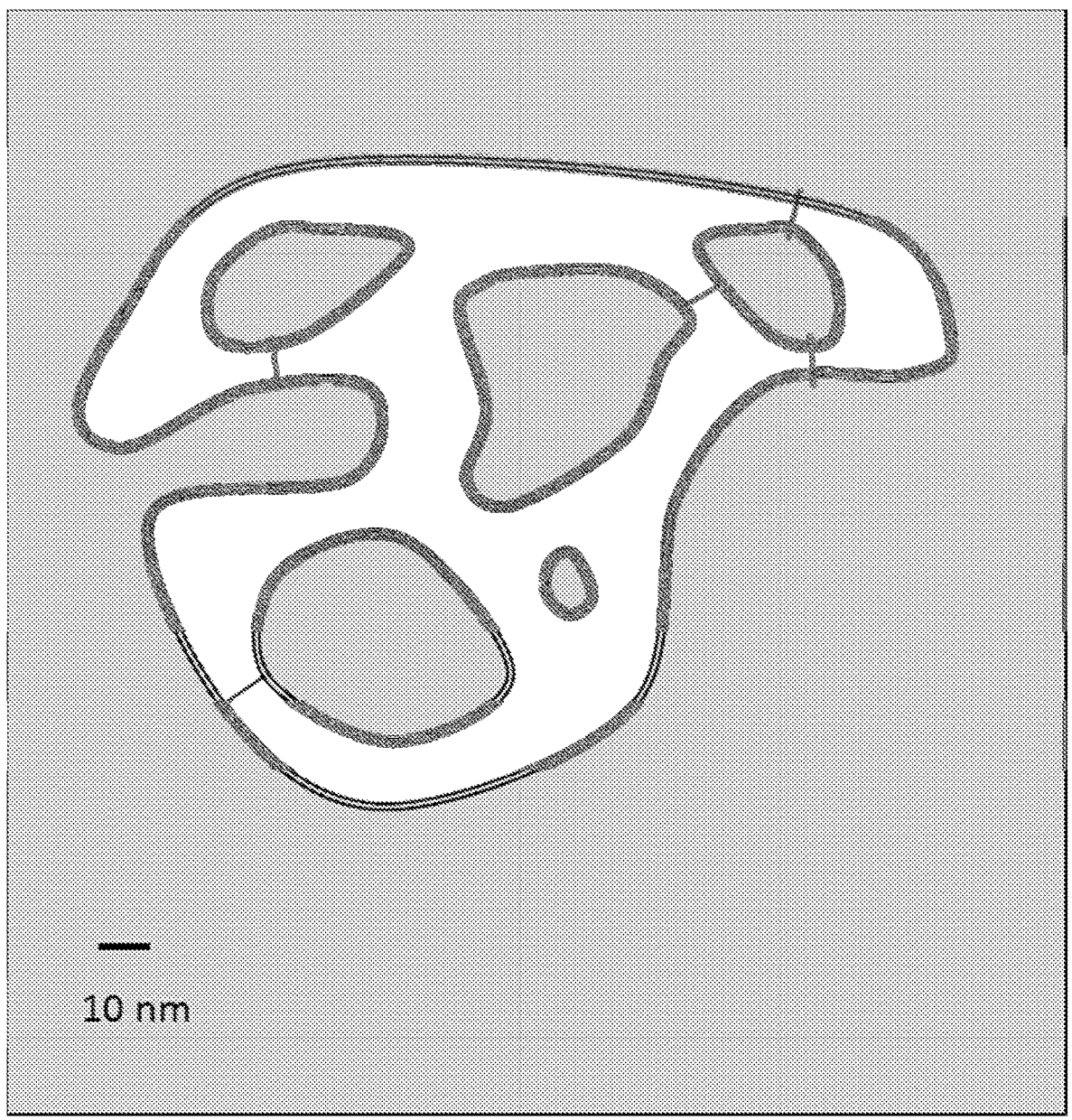
FIG. 7 is an illustration of a hypothetical cellular structure similar to the one in FIG. 6, but containing five exohedral holes. A thin cell wall is represented by the double black lines. The outside of the cell is the light grey region. The endohedral cavity is the white region. A scale bar in the bottom left provides a 10 nm length for reference. The illustrated structure is still somewhat lobular, but has become more dendritic as the spatial density of holes increases. In this illustration, the local cavity diameter is predominantly larger than 10 nm, but there are also areas in which the local cavity diameter is smaller than 10 nm, as indicated by the 10 nm reference lines drawn across the cavity in those areas.
Figure 8:
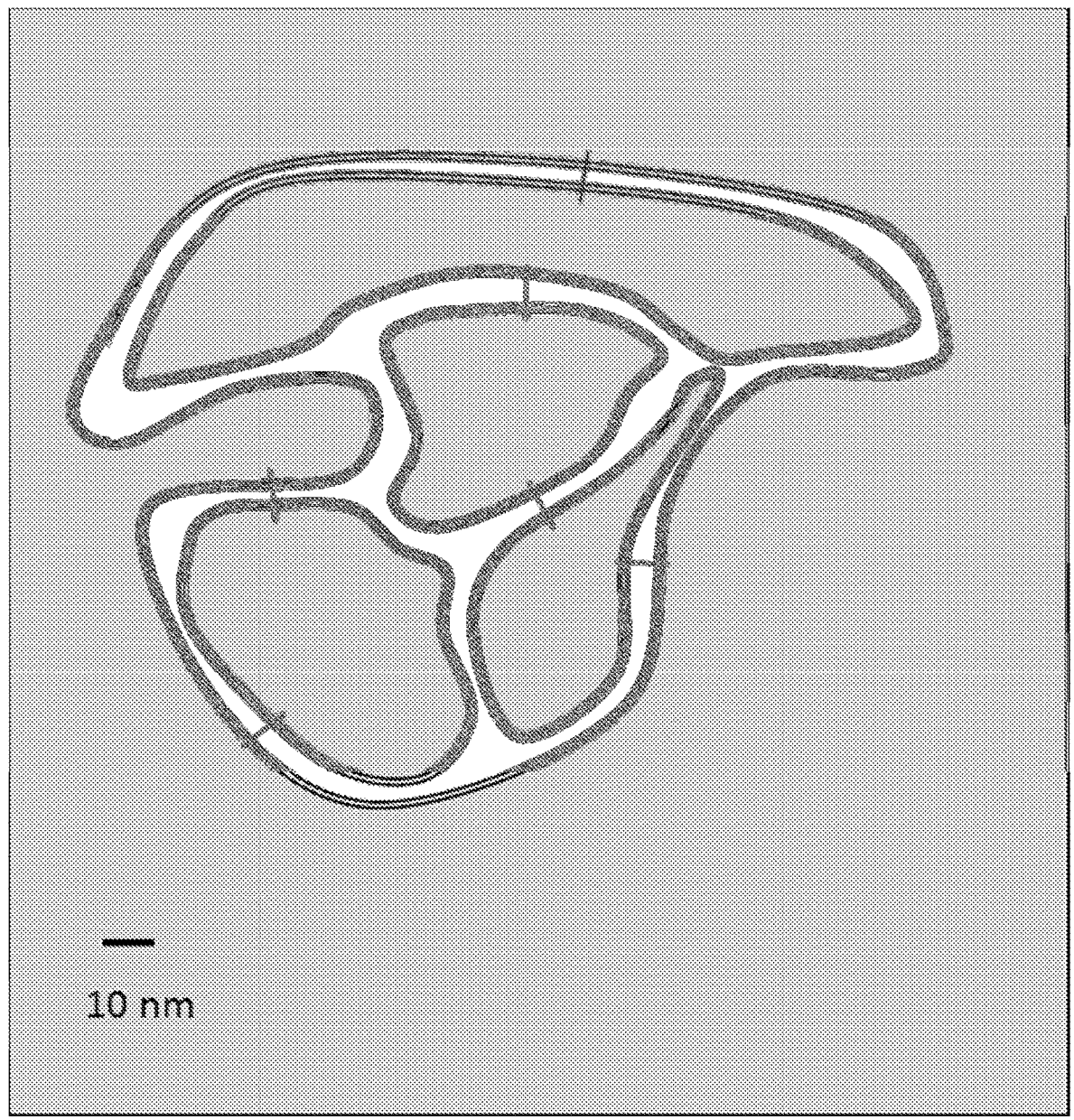
FIG. 8 is an illustration of a hypothetical porous structure similar to those in FIG. 6 and FIG. 7, but which contains a much higher spatial density of exohedral holes. A thin cell wall is represented by double black lines. The outside of the cell is the light grey region. The endohedral cavity is the white region. A scale bar in the bottom left provides a 10 nm length for reference. The higher spatial density of exohedral holes creates a dendritic structure. In this illustration, the local cavity diameter is predominantly smaller than 10 nm, as indicated by the 10 nm reference lines, and therefore this structure does not meet the second criterion.

2. A cellular carbon's cavity can be 10 nm or larger. Geometrically, this is shown in FIG. 4 by fitting a 10 nm diameter circle inside a 2D image of the cavity. A cavity would still fulfill this criterion if the cavity exceeds 10 nm along any two orthogonal chords, as also shown in FIG. 4, even if a 10 nm diameter circle does not fit within the cavity. For structures with multiple cavities, the majority are larger than 10 nm. Hence, the structure illustrated in FIG. 5, despite having a cavity smaller than 10 nm, fulfills this criterion. If exohedral holes are introduced, as illustrated in FIGS. 6-8, a cell may become lobular or dendritic. In such structures, the cavity generally possesses a local cavity diameter of 10 nm or larger. Hence, the structures illustrated in FIG. 6 and FIG. 7 qualify, while the structure in FIG. 8 does not.

Figure 9:
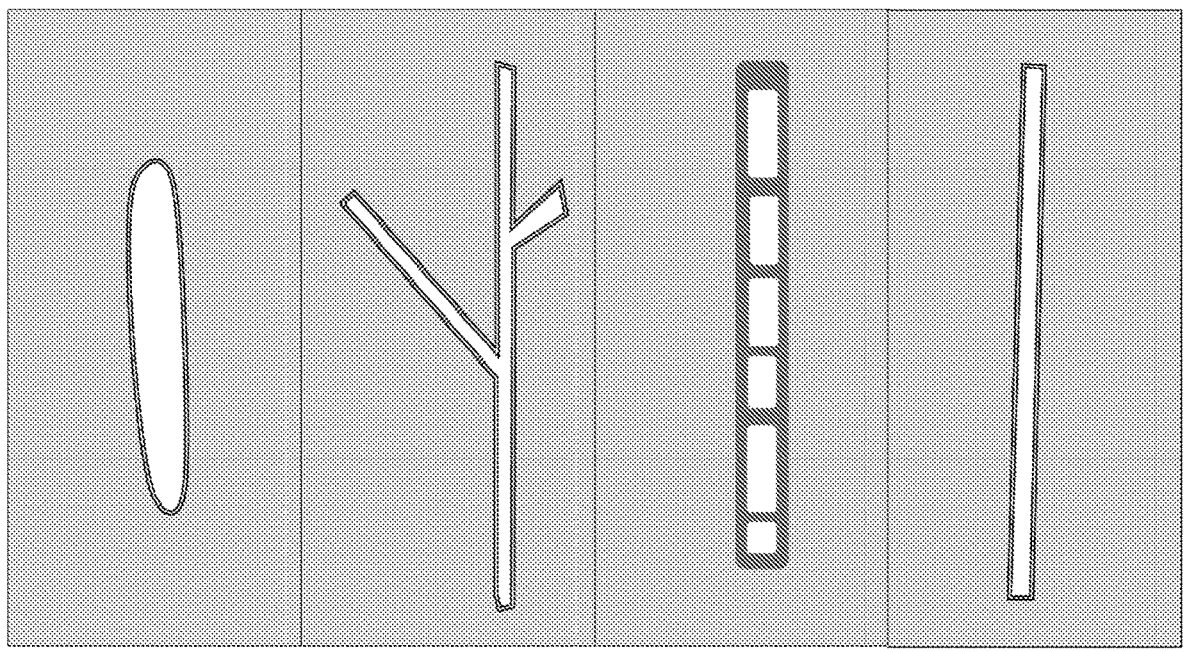
FIG. 9 is an illustration of four examples of particle structures. The cell walls are represented by double black lines or dark grey regions. The outside of the cells are the light grey regions. The endohedral cavities are the white regions. From left to right, the first structure is an elongated, linear cavity structure with an aspect ratio of greater than 5:1 and less than 10:1, where the aspect ratio is defined as the cavity's length vs. its maximum diameter. The second structure is a highly elongated (i.e., aspect ratio of greater than 10:1) cavity structure that is nonlinear due to branching. The third structure contains multiple, discontinuous cavities, each possessing an aspect ratio of less than 5:1. The fourth structure on the right-hand side contains a single, linear, highly elongated cavity, typical of a nanotube.

3. The cavities in cellular carbons are not both highly elongated and linear. As defined herein, "highly elongated linear cavities" possess an aspect ratio greater than 10:1, where aspect ratio is the ratio of the linear structure's length to its maximum diameter. As defined herein, "linear" describes an unbranched, continuous structure that possesses an aspect ratio greater than 5:1. For clarity, FIG. 9 includes four examples. The first three structures from left in the figure are of linear structures according to this definition. The structure to the far right of FIG. 9, however, is both linear and highly elongated, like a carbon nanotube. Accordingly, this structure does not exhibit criterion #3.

4. A cellular carbon structure is discontinuous over length scales greater than 1,000 µm. The aggregate form factor of a cellular carbon population is therefore typically a powder or fine granulated powder that can be dispersed into a liquid.

Figure 10:
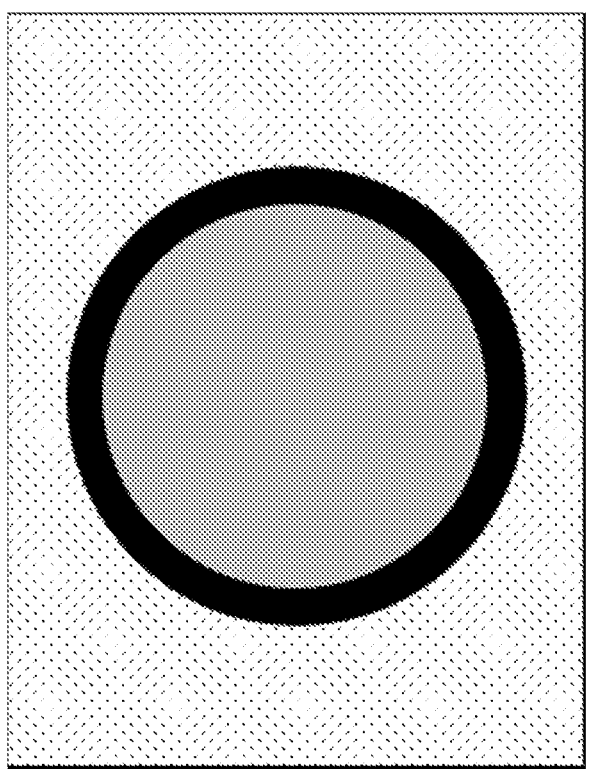
FIG. 10 is an illustration of a ternary template-shell-matrix system. The template phase is the grey region in the center, the shell is the black region, and the matrix is the patterned outer region. This illustration reflects the system in which a cellular carbon is deterministically formed. Formation of the cell wall occurs conformally around a well-defined, distinct template phase, such that the shell separates the endohedral template and exohedral matrix.
Figure 11:
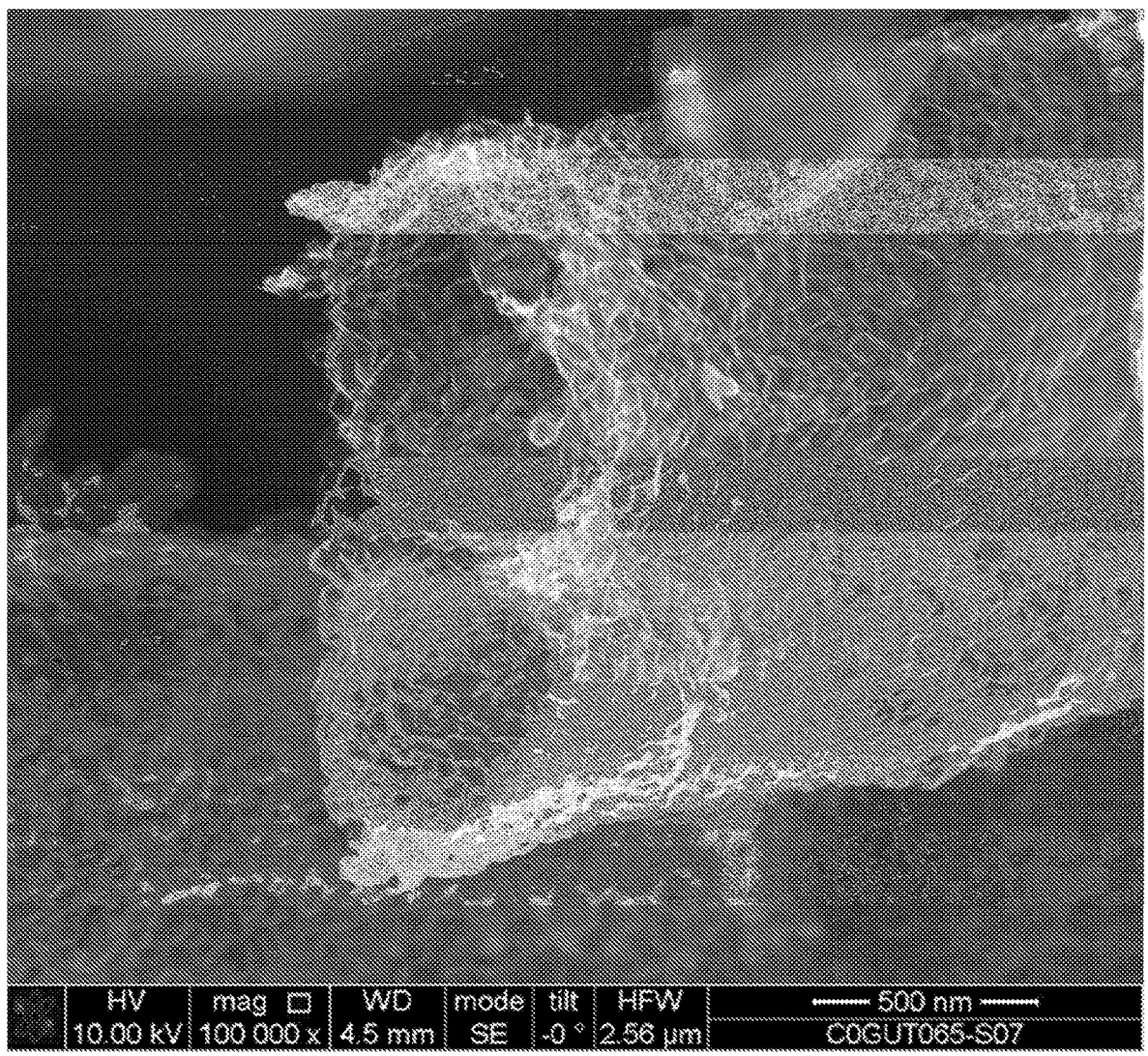
FIG. 11 is an SEM micrograph of a cellular carbon structure grown on a double-barrel, hollow cylindroidal template. The holes in the template have been inherited by the cellular carbon structure, resulting in a double-barrel morphology traversed by two exohedral holes. Exohedral holes are not considered to be part of the cellular cavity, since they are extrinsic to the templated cell cavity. The cell cavity corresponds spatially to the endohedral template phase during formation, while exohedral holes correspond to the space occupied by the matrix phase during formation.
Figure 12:
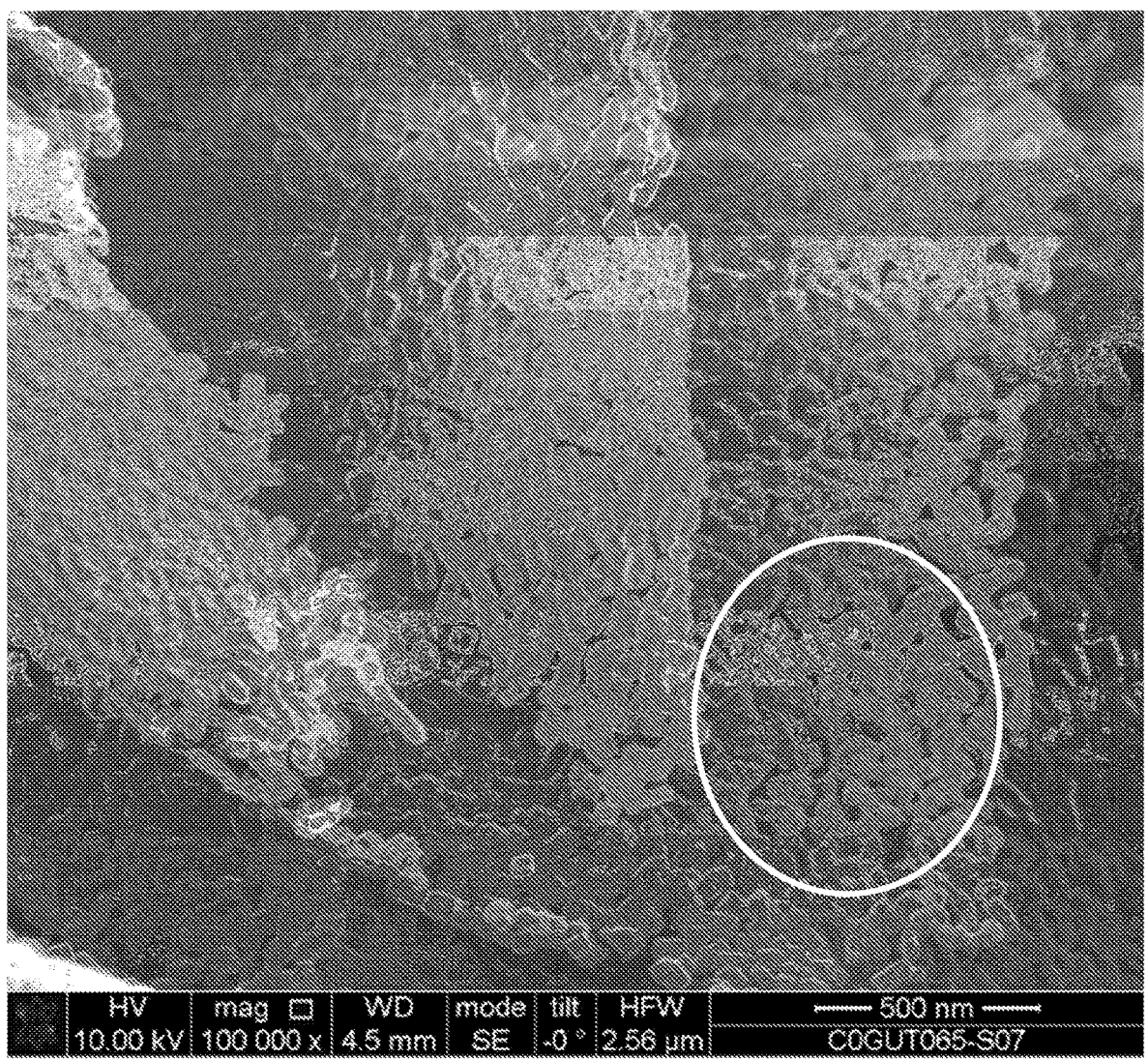
FIG. 12 is an SEM micrograph of a cellular carbon structure comprised of discretized cells interconnected in sheet-like microstructures. Numerous exohedral holes can be observed between neighboring cells, as can be seen within the white circle.

5. A cellular carbon inherits its cavity morphology and endohedral surface features from a gas, liquid, or solid templates the template's. This results from the conformal synthesis of the cell wall at the interface of two distinct internal and external phases (as illustrated in FIG. 10). A cellular structure formed on a template penetrated by holes may inherit exohedral holes. Exohedral holes are not part of the endohedral cell cavity. An example is the cellular carbon shown in FIG. 11, which inherited its two exohedral holes from a double-barrel, hollow cylindroid template. Another example is the cellular carbon shown in FIG. 12, which is a cellular sheet through which numerous exohedral holes can be observed between the cells.

Figure 13:
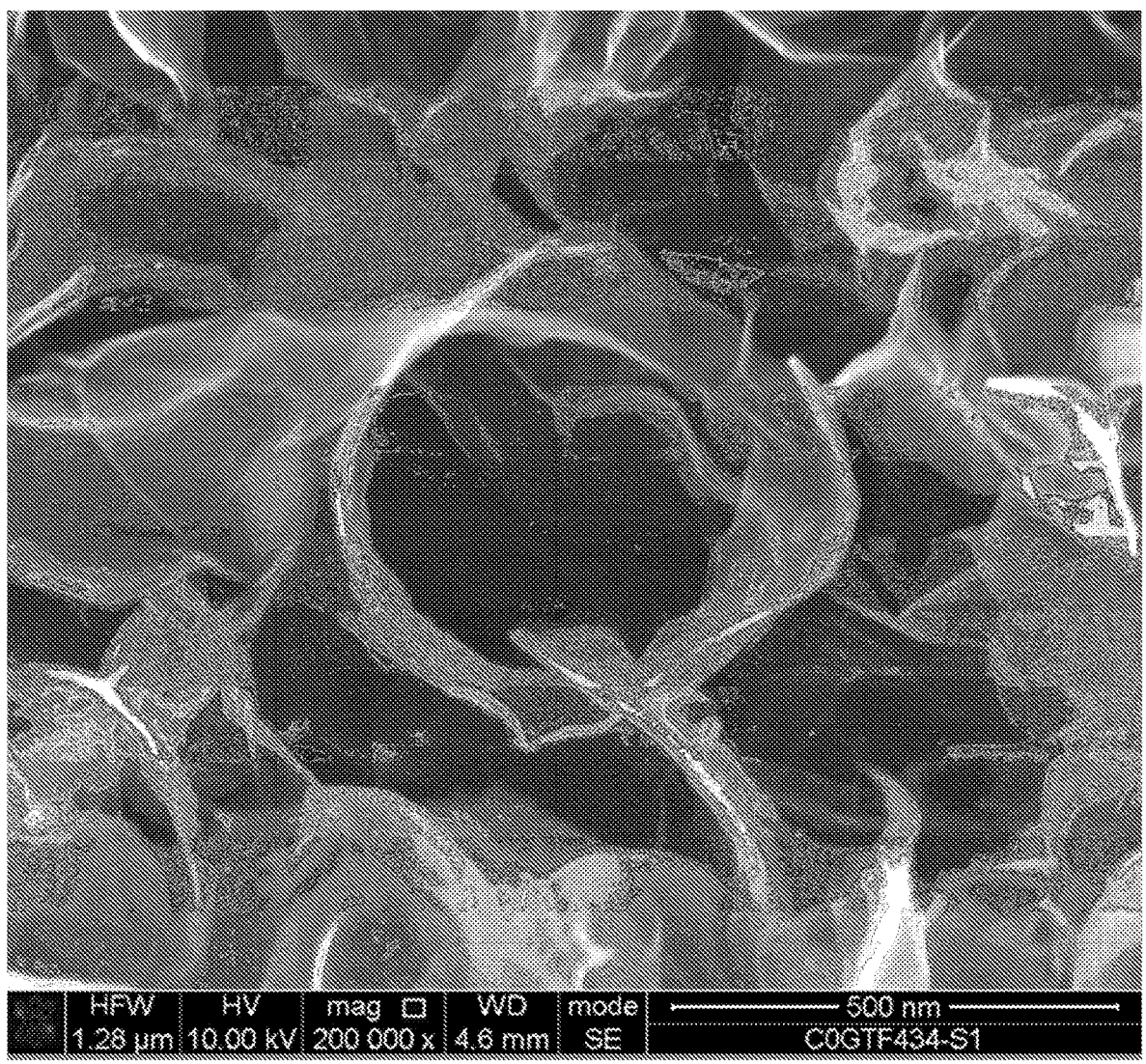
FIG. 13 is an SEM micrograph of degenerate cells. The cells as-synthesized were spheroidal in morphology, but due to post-synthesis mechanical stresses created by the template extraction process, the particles have broken into curved fragments. The concave curvature of the fragments reflects the particles' formation on a convex template. The fragments are adhered to one another, but this image also shows the retention of large interparticle spaces imposed by the particles' inherited curvature.

6. A "cellular carbon derivative" is a cellular carbon that has been morphologically altered by post-synthesis mechanical, thermal, electrical, or chemical processes. As a result of these processes, the derivative may be fragmented, deformed, collapsed, or subjected to other structural changes. Nevertheless, these derivatives share some morphological properties with their cellular precursors. FIG. 13 shows fragments of a spheroidal cellular carbon precursor. The fragments still exhibit the basic shape of their precursor, but are more open in architecture, possessing concave and convex curves instead of inner and outer cell wall surfaces.

A cellular carbon, as classified herein, should exhibit the first five criteria or have a derivative structure consistent with the sixth criterion. Derivative structures as described in the sixth criterion are generally derived from precursor structures classifiable as cellular carbons. Measurements to assess criteria 1-5 may be made using electron microscopy or other suitable high-resolution imaging methods. While measurements made using two-dimensional micrographs such as SEM or TEM may not yield a complete three-dimensional mapping of each cellular carbon's structure, such measurements may nevertheless be used to measure the general features pertaining to a population of cellular structures. All measurements made or illustrated herein are based on two-dimensional micrographic analysis.

Criterion #1 distinguishes cellular carbons from porous carbons lacking nanostructured walls. Thicker walls reduce the carbon's specific surface area and increase particle density (i.e., the carbon mass divided by its total volume, inclusive of enclosed pores). The thinner walls pertaining to cellular carbons enable hollow architectures that can match the low particle density of thicker-walled hollow carbons, while possessing much smaller endohedral cavities. Thinner, more two-dimensional walls also offer more interfacial surface area, an important property of fillers in nanocomposites, as well as other properties (such as superior conductivity and mechanical properties etc.) that are exhibited by two-dimensional vs. bulk carbon materials.

Criterion #2 pertains to the size of the cavities in cellular carbons. Their cavities, which are of intermediate size, distinguish cellular carbons from other porous carbon morphologies. On the smaller side are porous nanostructured carbons (nanotubes, fullerenes, ordered mesoporous carbons, etc.), and on the larger size are much larger hollow carbon structures (cenospheres, hollow carbon microspheres, etc.). Between the smaller and larger porous morphologies is a range of cavity sizes seldom found in porous carbons, which more commonly have average pore diameters smaller than 10 nm or larger than 1,000 nm. This range in volumetric terms is a function of the cube of the pore diameter, e.g., there is a $10^6$ volumetric difference between two hypothetical spherical pores with respective diameters of 10 nm and 1,000 nm. The smaller pores of most nanostructured carbons impose a lower limit on their particle density and specific porosity. For instance, a fullerene with diameter of less than 1 nm is hollow, but its cavity is only a little larger than double the space between two graphitic planes. Similarly, while most carbon nanotubes are traversed by a very long central pore, a typical pore diameter is only a few nanometers. Some cellular carbons are well over an order of magnitude less dense.

Criterion #2 is important for several reasons. Density reduction is a desirable feature in materials like syntactic foams that are used for buoyancy or weight reduction. Most carbons with smaller cavities are not particularly buoyant. Even if the pores contained in cellular carbons are impregnated with a liquid or solid matrix material instead of a gas, their low spatial density will be advantageous. For instance, a cellular carbon is an excellent structure for achieving percolation in a matrix. Thin-walled cells can pack tightly and continuously into a three-dimensional, lightweight network that results in low percolation thresholds, which can be an attractive characteristic for nanocomposite products such as conductive inks in which cost is mostly driven by the amount of carbon required to achieve conductivity. Large endohedral cavities also allow cellular carbons to occupy a high nanocomposite volume fraction at low weight percentages of the overall composite. Lastly, cellular structures with larger endohedral spans can potentially undergo greater elastic or plastic deformation in response to mechanical stresses.

Criterion #3 distinguishes cellular carbons with a linear cavity morphology from nanotubes and microtubes on the basis of elongation. In general, highly elongated linear particles like carbon nanotubes suffer from poor packing density, a tendency to entangle due to their bundling efficiency [7], and viscosity build-up in colloidal dispersions. For this reason, hollow nanofibers are often milled, but even high-energy milling processes have practical limitations. For one, there are limits to how much particle shortening can be achieved via milling, and drastic shortening may require many hours of process time. Second, milling processes may negatively affect the particle size distribution and morphological regularity by generating debris. By contrast, cellular particles with linear structures and a more truncated shape factor can be created ab ovo. Truncated structures may be less prone to entanglement, may offer superior packing density, and may not build viscosity as severely as highly elongated structures. A more truncated cavity shape may also be desirable if impregnation is required, since this mitigates the inaccessibility of highly elongated nanostructures to diffusive fluid flows [8-9]. Alternatively, if elongated structures are desired for percolation in a nanocomposite, a branched (i.e., non-linear) cell morphology can be used. Such a morphology enables a spatially diffuse network, while being potentially less prone to entanglement due to the inability of clustered particles to interpenetrate one another.

Criterion #4 distinguishes cellular carbons from porous carbon preforms such as aerographite that are monolithic or interconnected at the 1,000 μm scale or higher. This can be practically important insomuch as cellular carbons, due to their structural discontinuity, are readily dispersible into flowable nanocomposite dispersions. Dispersibility is advantageous for many product implementations such as dispensed inks, spreadable coatings, infusible resins, and otherwise. It also makes wetting and impregnation of the cavities easier since vacuum impregnation is rendered less important.

Criterion #5 distinguishes cellular carbons from other porous carbons based on their templated cavity and internal topography. As used herein, the term "template" refers to an internal solid, liquid, or gas region around which the shell of the cellular carbon (or its carbonaceous precursor) is conformally synthesized or assembled, such as in a nested template-shell-matrix (1-2-3) system. In this ternary system the carbon or carbonaceous precursor shell (2) is located at the interface of the internal template (1) and the external matrix (3). The shell's geometry, size, and endohedral topography are all inherited from the template during the shell's formation. Examples of template-shell-matrix systems include: gas blowant templates (1) trapped inside carbonaceous liquid droplets (2) suspended in an external gas matrix (3); oil droplets (1) coated by graphene oxide nanoplatelets (2) in an aqueous matrix (3); and metal oxide templates (1) inside carbon shells (2) that are inside a carbonaceous gas matrix (3).

Templated cavities are an important architectural property that differentiates cellular carbons from other porous carbons. Because the cell cavity morphologies across a population of particles are non-random, and because the particles' cell walls are conformal and two-dimensional, highly uniform particle populations are possible (although not necessary; in fact, one benefit of uniform particle populations is the ability to blend them to create controlled, polydisperse particle distributions for tailored composite properties). By contrast, most cavity-containing carbons possess a random, disordered cavity morphology because they are synthesized in a binary carbon-matrix system that lacks a distinct template phase. For example, few-layer graphene nanoplatelets (GNPs) produced via liquid-phase exfoliation may evolve incidental cavities as a result of folding, wrinkling, inter-particle adhesion, or random interactions with the surrounding matrix. But because there is no distinct template phase, these cavities can be disordered. Similarly, the disordered cavities in hydrothermally synthesized graphene aerogels may be the result of random self-assembly of graphene oxide nanoplatelets in an aqueous matrix. This system can lack a distinct template phase, being comprised of only the carbon and the matrix. Alternatively, carbons may be formed in a ternary system in which none of the three phases qualify as a "template" as defined herein. For instance, petroleum cokes or chars exhibit randomly evolved pore structures that are created as internal volatilized species (phase 1) migrate through carbonaceous structures (phase 2) in an external gas atmosphere (phase 3). However, these volatilized species may not meet the criteria for a template, since the carbon structure is not synthesized or assembled conformally around them, but is instead randomly etched by them from inside out.

Criterion #6 relates to carbon structures that are primarily derived from cellular carbon precursors, but that have been morphologically altered by post-synthesis processing such that they either no longer meet all of the cellular carbon criteria or they exhibit features pertaining to both cellular and non-cellular carbons. For instance, a cellular carbon produced on a metal oxide template might be subjected to an acid extraction process that dissolved the metal oxide template, but in the process may cause random breakage and degeneration of the cellular structure. An example of such a sample is shown in FIG. 13, which is an SEM micrograph of degenerate cells. As produced, these particles were spheroidal in morphology, but due to post-synthesis mechanical stresses created by template extraction, the particles were broken into curved fragments. The concave curvature of the fragments reflects the particles' formation on a convex template. The fragments are adhered to one another, but this image also shows the retention of large interparticle spaces imposed by the particles' inherited curvature. Another common derivative is a cellular carbon nanoparticle in which the cell wall, while intact, is thin enough to collapse, resulting in a derivative that appears deflated due to the flattening of its cavity. Impregnation of such a derivative with a liquid or solid filler may restore the three-dimensionality of its cavity.

Derivative structures are important because they possess many of the properties of their cellular carbon precursors. A cell fragment may no longer have an internal pore, for example, but may retain a high degree of curvature that geometrically disallows dense agglomeration and surface area occlusion. [Its non-planarity may yield interparticle spacing and surface area retention within a nanocomposite.] In certain cases, the derivatives may even be preferable to their cellular precursor. If rapid impregnation of the cell cavities with a liquid matrix material is desired, as is the case for two-component resin systems with a short pot life, the surfaces of a fragment with an open concavity will be easier and faster to wet out and impregnate then the endohedral surfaces of a more intact, closed cellular architecture. For nanocomposite matrices with multiple liquid components blended in sequential steps, achieving an equilibrated composition of components inside and outside of more intact cellular structures may be difficult, especially if those multicomponent compositions are highly reactive.

Another reason that cellular derivatives are important is that, relative to their cellular precursors, they often comprise a plurality of the carbon particles in a nanocomposite dispersion. In this respect, this disclosure's criteria for cellular carbons may often apply a rigorous structural definition to the precursors of the derivative structures actually found in the nanocomposite.

Cellular Carbon Architecture

One of the reasons for the diversity of cellular carbon types is the diversity of lattice-level and cell-level compositions. The cell walls are lamellar structures comprised of single-atom-thick carbon lattices adhered to one another in an overlapping, patchwork architecture. The lattices are the building blocks of the cell wall and vary by size, shape, orientation, molecular tiling, and surface chemistry. By modulating their lattice-level and cell-level architectures, two hypothetical cells that shared the same particle size, geometry, and even wall thickness might have dramatically different properties.

One source of variation among lattices is their molecular tiling. They may be amorphously tiled, possessing no short-range or long-range order, or they may be highly crystalline. If crystalline, they may be hexagonally tiled (e.g., graphene lattices) or possess some other tiling (e.g. a haeckelite tiling). Different lattice-level architectures may give rise to different behaviors. For instance, an amorphously tiled lattice comprised of 5-, 6-, and 7-member rings may be electrically insulating, whereas a defect-free graphene lattice is highly conductive [10]. A graphene lattice comprised of 8% to 10% defective rings may experience ductile failure and crazing under tension, whereas a relatively defect-free lattice will experience brittle failure and will possess superior strength and modulus [11-12]. Also, a perfectly crystalline graphene sheet is planar and therefore may be topologically unable to conform perfectly to a curved surface. For this reason, cellular carbons comprised of graphene lattices that are formed on curved templates may exhibit wrinkles and folds. If the cell wall is comprised of more defective crystal structures (i.e., containing 5-member rings, 6-member rings, 7-member rings, etc.), no wrinkles or folds are necessary for the lattices to conform to a curved template. Lastly, a multilayer cell wall could potentially contain sp3-hybridized bonds interconnecting overlapping sp2 lattices.

Figure 14:
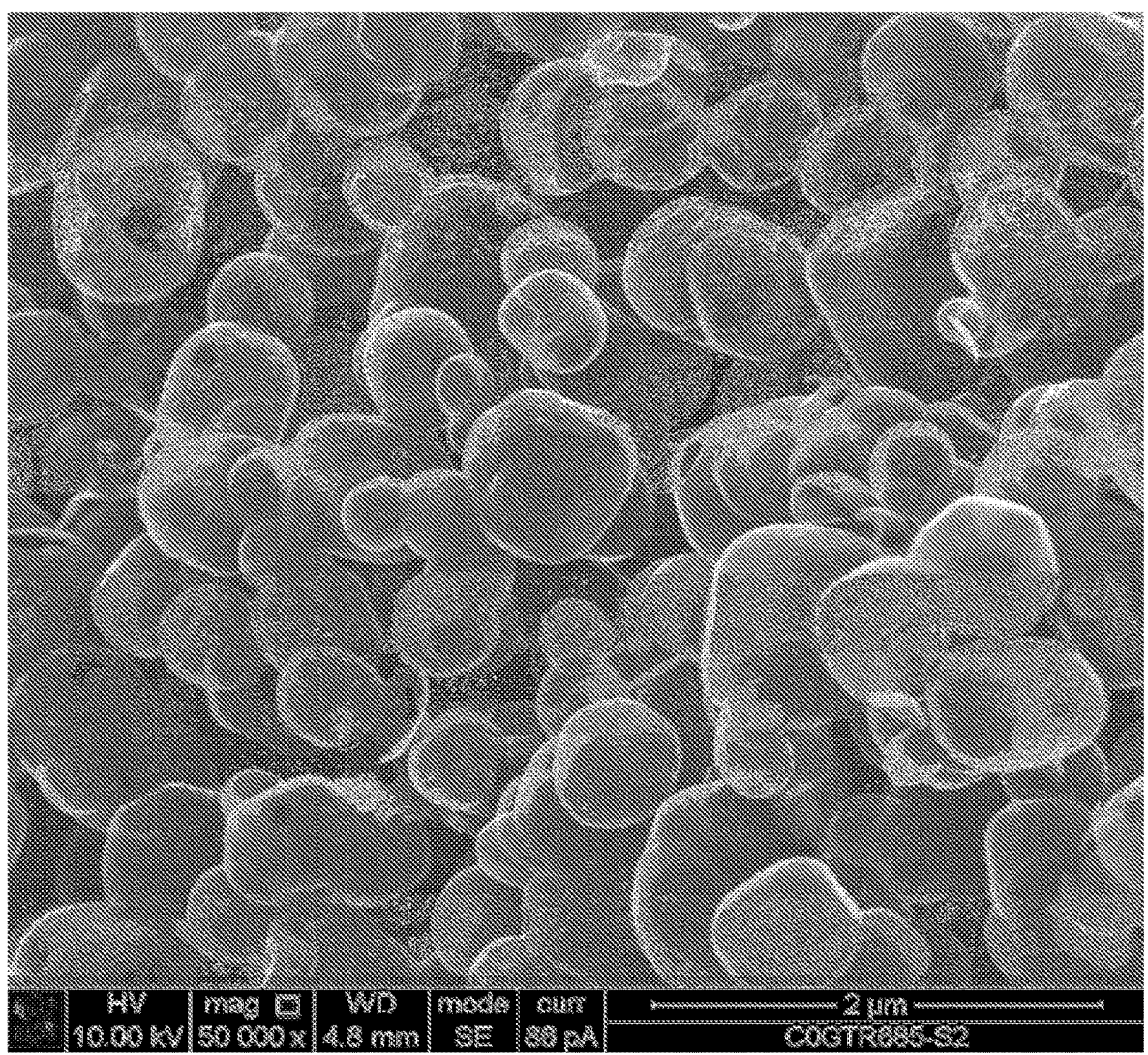
FIG. 14 is an SEM micrograph of cellular particles that contain in-plane lattice defects, allowing the lattices to conform to the surface of the template as they are formed around it. Consequently, the cell walls in this micrograph exhibit no signs of wrinkling or folding, but appear to be smoothly and seamlessly curved. The defectiveness of the cell wall, and possibly sp3 bonds interconnecting the sp2 lattices, may render it mechanically tougher, which can be inferred from the intact cellular structure and lack of fragmentation after template extraction.
Figure 15:
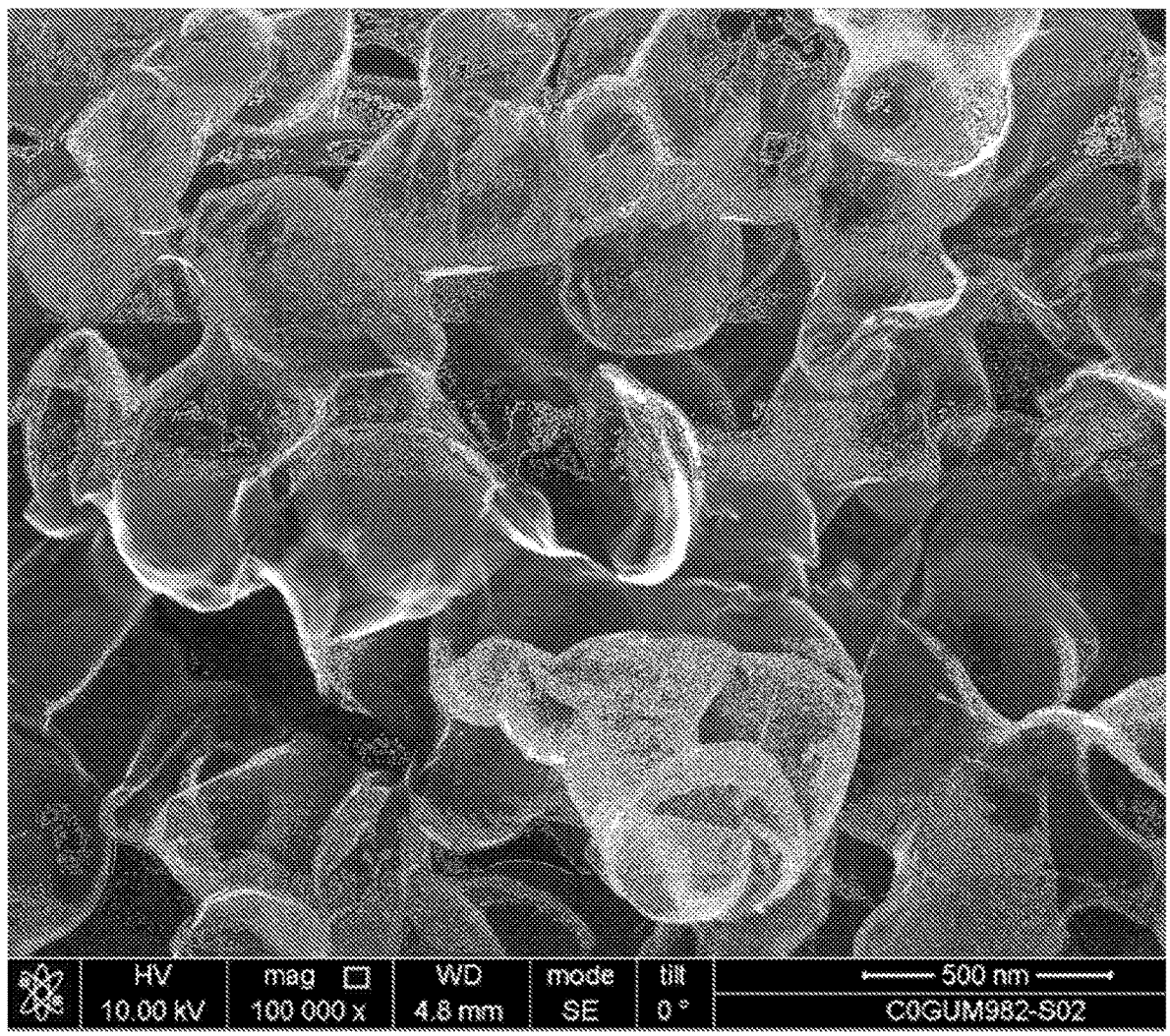
FIG. 15 is an SEM micrograph of cellular particles that are formed under conditions in which the lattices do not have in-plane lattice defects. As a result, the cell walls exhibit numerous wrinkles and folds on the surface, reflecting the topological mismatch of the planar carbon lattices draped over a non-planar template surface. The highly crystalline in-plane structure of the lattices may allow them to shear over one another more easily, causing breaches in the cell wall. The cellular structures appear more fragmented in this micrograph compared to FIG. 14.

Visual evidence of these topological differences can be observed in FIG. 14 and FIG. 15. In the SEM image shown in FIG. 14, the cell walls are comprised of defective carbon lattices that may be interconnected by sp3-hybridized bonds based on their smooth surface and intact cell structure. In the SEM image shown in FIG. 15, the cell walls are comprised of crystalline carbon lattices that may be more susceptible to shearing and delamination, resulting in a wrinkled or folded surface (taking the form of linear surface features) and a less intact cell structure after template extraction.

The walls may also vary by surface chemistry. A "pristine" (i.e., relatively defect-free) graphene lattice possesses virtually no basal plane functionalization, but a reduced graphene oxide or graphene oxide lattice will possess oxygen moieties. Various functionalization processes may be used to graft oligomers and polymers to the cell walls. The overlapping lattices that comprise the wall may have different interlayer spacings based both on their lattice chemistry as well as their orientations with respect to one another (e.g., AB Bernal stacking or turbostratic stacking).

In addition to possessing different molecular tilings, functionalities, stacking patterns, and interlayer spacing, the lattices may vary by lateral dimensions—i.e., their shape and area. This also can be an important determinant of the mechanical, electrical, thermal, and chemical properties of the lattices and cell walls. For instance, larger lattices may permit electron transport with less tunneling than smaller lattices, potentially decreasing the electrical resistance of the carbon structures.

The cell-level architecture may also be modulated to change the properties of the nanocomposite. Thicker walls may increase the density, specific surface area, and specific porosity of the carbons. Also, the cell wall structure may differ internally due to the orientation of the lattices with respect to the wall. If the lattices are oriented parallel to the cell wall surface, their edge chemistry may be occluded by other lattices. If the lattices are oriented such that their edges are exposed, however, their edge chemistry may greatly influence the properties of the cell wall surface. This principle has been illustrated in other, non-cellular carbons. For example, cup-stacked nanotubes have a tube wall architecture in which most of the graphene edges are exposed. This orientation increases the overall reactivity of the wall surface compared to a wall surface dominated by the lattices' basal planes and can make dispersing cup-stacked nanotubes easier in many systems [13]. FIG. 2 illustrates cell walls of two different lattice orientations.

Another way that cell walls can vary is in their porosity. Multilayer cell walls will likely have subnanometer interlayer pores, as is characteristic of graphite. But the transverse pores that go through the wall may be more variable and of greater significance. The transverse pores might be due to incomplete wall formation during synthesis, or the result of breaches formed during template extraction. The number and size of the transverse pores may affect the speed of diffusive flows into and out of the cell cavities. Cell walls with fewer, smaller pores may take longer to impregnate with matrix fluids.

Procedural Overview

All of the carbon cells and cellular derivatives described herein were synthesized using chemical vapor deposition (CVD) on powder templates. However, it is to be understood that these are merely examples, as are the synthesis procedures, described herein. This process for growing cellular carbons has been described in greater detail in U.S. Patent Provisional Application 62/294,751. Several carbon production protocols were used to synthesize cellular carbons and derivatives of different sizes, shapes, and wall compositions with the objective of demonstrating the utility of cellular carbons for imparting physical, mechanical, and electrical properties to polymer nanocomposites.

All of the templates used were grades of magnesium oxide (MgO) powder. MgO is a well-known catalyst in the thermocatalytic decomposition of carbonaceous precursor gases. CVD growth was performed at various temperatures in a tube furnace using several hydrocarbon precursors.

After CVD was completed, the resulting MgO/C coreshell heterostructures were reacted with dilute hydrochloric acid (HCl), dissolving the MgO template particles and leaving the carbon shell intact. The carbons were then filtered from the aqueous $MgCl_2$ solution to produce an aqueous carbon paste. This paste was rinsed thoroughly with deionized water and then filtered again. In some cases, a solvent exchange process was used to replace the water with acetone, resulting in an acetone paste. This paste was then blended directly into the nanocomposite formulation or was evaporatively dried to form a dry powder that could be blended into the nanocomposite or subjected to further CVD growth.

To create the nanocomposites for testing, the cellular carbons and derivatives, along with other non-cellular carbons sourced commercially for comparison, were dispersed into the matrices. Thermosetting nanocomposites were poured, cast, cured, and machined to form the thermosetting test specimens. Thermoplastic nanocomposites were molded using a hot press system to form the thermoplastic test specimens. Coating samples were made by coating the nanocomposite dispersion onto polyethylene (PET) film.

Cellular Carbon Synthesis

Three samples (S1-S3) of cellular carbons were synthesized via CVD in an MTI rotary tube furnace outfitted with a 100 mm OD quartz tube, stainless steel flanges, gas feed inlets and a single bas outlet. All process gases were sourced from Praxair.

For S1, a methane/argon mixture was employed as the feed gas. For this sample, a 500 gram sample of Elastomag 170 MgO ("EL170") was loaded into a quartz tube (OD 100 mm) inside the furnace's heating zone. No rotation was employed. The reactor was ramped from room temperature to a temperature setting of 1050° C. over 50 minutes and maintained at that temperature for 30 minutes under 500 sccm Ar flow. Next, a 500 sccm $CH_4$ flow was initiated while holding Ar flow unchanged. This was continued for 30 minutes. The $CH_4$ flow was then discontinued and the reactor was allowed to cool to room temperature under continued Ar flow. The MgO was then extracted by acid-etching with HCl, resulting in a slurry of carbon in an aqueous $MgCl_2$ brine. The carbon was then filtered from the brine, rinsed with deionized water thrice, and collected as an aqueous paste. A solvent exchange process was then used to replace the water with acetone, resulting in the S1 acetone/cellular carbon paste.

For S2, a propylene/argon mixture was employed as the feed gas. For this sample, a 500 gram sample of EL170 was loaded into the quartz tube inside the furnace's heating zone. No rotation was employed. While under 500 sccm of Ar flow, the reactor was ramped up from room temperature to a temperature setting of 1050° C. over 50 minutes, then ramped down to 750° C. over 30 minutes, and then maintained at that temperature for 30 minutes. Next, a 250 sccm $C_3H_6$ flow was initiated while holding Ar flow unchanged. This was continued for 60 minutes. The $C_3H_6$ flow was then discontinued and the reactor was allowed to cool to room temperature under continued Ar flow. The MgO was then extracted by acid-etching with HCl, resulting in a slurry of carbon in an aqueous $MgCl_2$ brine. The carbon was then filtered from the brine, rinsed with deionized water thrice, and collected as an aqueous paste. A solvent exchange process was then used to replace the water with acetone, resulting in the S2 acetone/cellular carbon paste.

For S3, a methane/argon mixture was employed as the feed gas. For this sample, a 300-gram sample of magnesium oxide smoke (made by combusting magnesium metal) was loaded into the quartz tube inside the furnace's heating zone. No rotation was employed. Under 500 sccm Ar flow the reactor was ramped up from room temperature to a temperature setting of 1050° C. over 50 minutes and maintained at that temperature for 30 minutes. Next, a 800 sccm $CH_4$ flow was initiated while holding Ar flow unchanged. This was continued for 30 minutes. The $CH_4$ flow was then discontinued and the reactor was allowed to cool to room temperature under continued Ar flow. The MgO was extracted by acid-etching with HCl, resulting in a slurry of carbon in an aqueous $MgCl_2$ brine. The carbon was then filtered from the brine, rinsed with deionized water thrice, and collected as an aqueous paste. A solvent exchange process was then used to replace the water with acetone, resulting in the S3 acetone/cellular carbon paste.

For S4, a methane/argon mixture was employed as the feed gas. For this sample, a 500-gram sample of EL170 was loaded into a quartz tube (OD 100 mm) inside the furnace's heating zone. Rotation of the tube during the reaction was employed. The reactor was ramped from room temperature to a temperature setting of 1050° C. over 50 minutes and maintained at that temperature for 30 minutes under 500 sccm Ar flow. Next, a 1000 sccm $CH_4$ flow was initiated while holding Ar flow unchanged. This was continued for 45 minutes. The $CH_4$ flow was then discontinued and the reactor was allowed to cool to room temperature under continued Ar flow. The MgO was then extracted by acid-etching with HCl, resulting in a slurry of carbon in an aqueous $MgCl_2$ brine. The carbon was then filtered from the brine, rinsed with deionized water thrice, and collected as an aqueous paste. The paste was added to a sodium hypochlorite solution (NaOCl) of 10-15% available chlorine. The ratio of carbon to NaOCl solution was 1:40. This mixture was stirred at room temperature for 24 hours. The carbon was then filtered from the bleach, rinsed with deionized water thrice, and collected as an aqueous paste. A solvent exchange process was then used to replace the water with acetone, resulting in the S4 acetone/cellular carbon paste.

For S5, a propylene/argon mixture was employed as the feed gas. For this sample, a 500-gram sample of EL170 that had been calcined overnight at 900° C. was loaded into the quartz tube inside the furnace's heating zone. No rotation was employed. While under 500 sccm of Ar flow, the reactor was ramped up from room temperature to a temperature setting of 750° C. over 30 minutes and then maintained at that temperature for 30 minutes. Next, a 1000 sccm $C_3H_6$ flow was initiated while holding Ar flow unchanged. This was continued for 30 minutes. The $C_3H_6$ flow was then discontinued and the reactor was allowed to cool to room temperature under continued Ar flow. The MgO was then extracted by acid-etching with HCl, resulting in a slurry of carbon in an aqueous $MgCl_2$ brine. The carbon was then filtered from the brine, rinsed with deionized water thrice, and collected as an aqueous paste. A solvent exchange process was then used to replace the water with acetone. The resulting acetone/cellular carbon paste was dried to produce a carbon powder. This powder was then functionalized using a 1,3 Dipolar cycloaddition protocol. For this, equal parts of N-methylglycine and 4-Formylbenzoic acid were dissolved in DMF. To this solution the cellular carbon powder was added and refluxed for 96 hours under an $N_2$ atmosphere. The functionalized carbon after reflux was thoroughly washed with acetone thrice, resulting in S5 acetone/functionalized cellular carbon paste.

Figure 16:
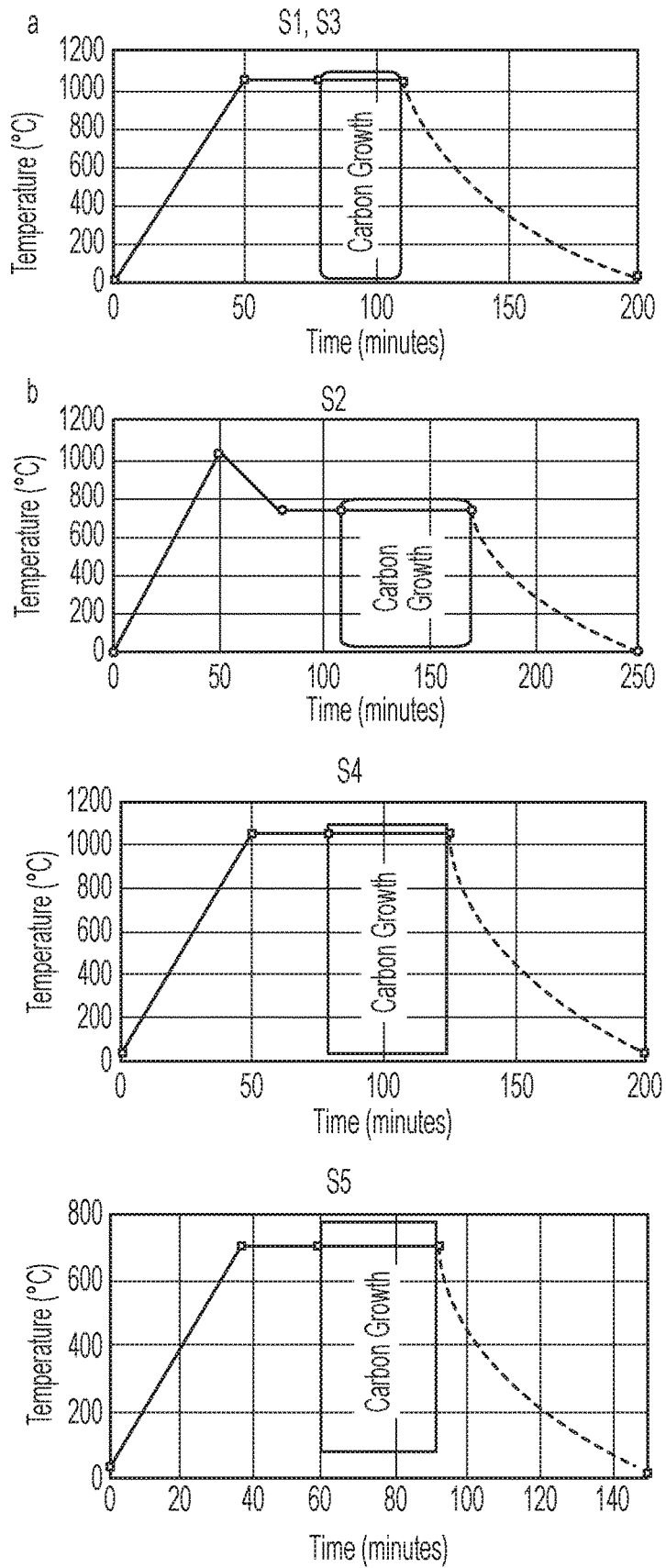
FIG. 16 is a chart showing the CVD reactor time vs. temperature settings used to synthesize each of the cellular carbon samples S1, S2, S3, S4, and S5. The top diagram is the time vs. temperature settings used for S1 and S3, while the bottom diagram pertains to S2.

For reference, the charts in FIG. 16 show the CVD time vs. temperature settings used to synthesize each of the cellular carbon samples.

Characterization of Carbons

Each of the cellular carbon samples was characterized post-extraction using Raman spectral analysis, TGA, SEM and TEM imaging, and ash testing.

Figure 17:
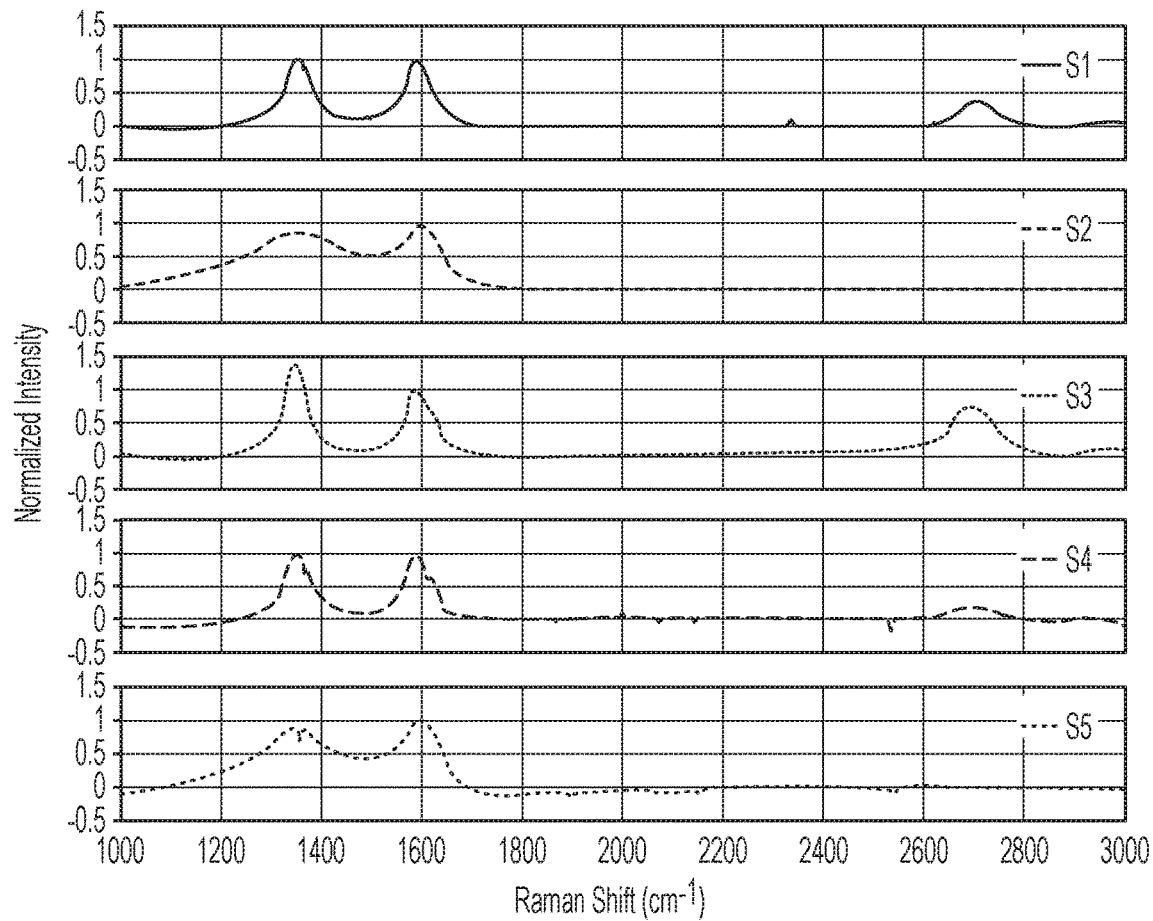
FIG. 17 is the Raman spectra of the S1, S2, S3, S4, and S5 carbon samples. The S1 and S3 spectra exhibit prominent 2D peaks and a high D peak. The S2 sample exhibits an amorphous Raman spectra (easily identifiable by the much higher trough feature at 1500 $cm^{-1}$). The peak intensity ratios for the carbon samples are shown at bottom.

The Raman spectral analysis was conducted on the carbon cells (S1, S2, and S3) after extraction of the template materials and are shown in FIG. 17. Three main spectral features are typically associated with sp2-bonded carbon: the G band, the 2D band (alternatively called the G band), and the D band. The G band is present for all sp2 carbons and, therefore, can provide a Raman signature for sp2 carbon crystals. The peak in this band is observed at 1585 cm−1. The 2D or G' band, which lies between 2500 cm−1 and 2800 cm−1, is associated with continuous sp2 carbon structuring in the two-dimensional direction. The D band, which lies between 1200 cm−1 and 1400 cm−1 is associated with lattice disorder. As disorder increases, the intensity of the D peak may reach a maximum, after which increasing disorder causes the peak to broaden and decrease in height. When this broadening happens, the trough between the D and G peaks becomes shallower (i.e., its intensity increases). Therefore, measuring the trough intensity can indicate broadening of the D peak. Accordingly, the present disclosure defines a fourth feature, the "T band," which is the trough between the D peak and the G peak. The T band intensity is defined as the local minimum intensity value occurring between the wavenumber associated with the D peak and the wavenumber associated with the G peak. The intensities of the G, 2D, D, and T bands are designated herein as $I_G$, $I_{2D}$ (or $I_{G'}$), $I_D$, and $I_T$, respectively.

Raman spectra may vary from location to location in a sample for a variety of reasons, some not directly related to the structural features of interest. Therefore, in order to ensure a representative characterization of the templated carbons produced in the experiments described herein, the following procedure has been used. First, 60 distinct point spectra were measured for each carbon sample. The measurements are made over a 6×10 point rectangular grid with point-to-point intervals of 50 μm. The 60 distinct point spectra were then averaged to create a composite spectrum. All of the peak intensity ratios reported herein relate to the composite spectrum derived from these 60 point spectra measurements.

The spectra for samples S1 and S3 in FIG. 17 reveal a moderate to high degree of two-dimensional ordering. This is shown in their prominent 2D peaks ($I_{2D}/I_G$ ratios of greater than 0.46). By contrast, sample S2 exhibits virtually no 2D peak ($I_{2D}/I_G$ ratio of less than 0.10) and a very broad D peak, indicating a more defective crystal structure.

TGA analysis was conducted on the carbon cells after extraction of the template materials and after covalent functionalization (S4). The TGA curves (FIG. 18) show mass retention as a percentage of the initial sample mass and were generated in an inert argon atmosphere with a flow rate of argon at 100 mL/min and a heating rate of 10° C./min.

Figure 19:
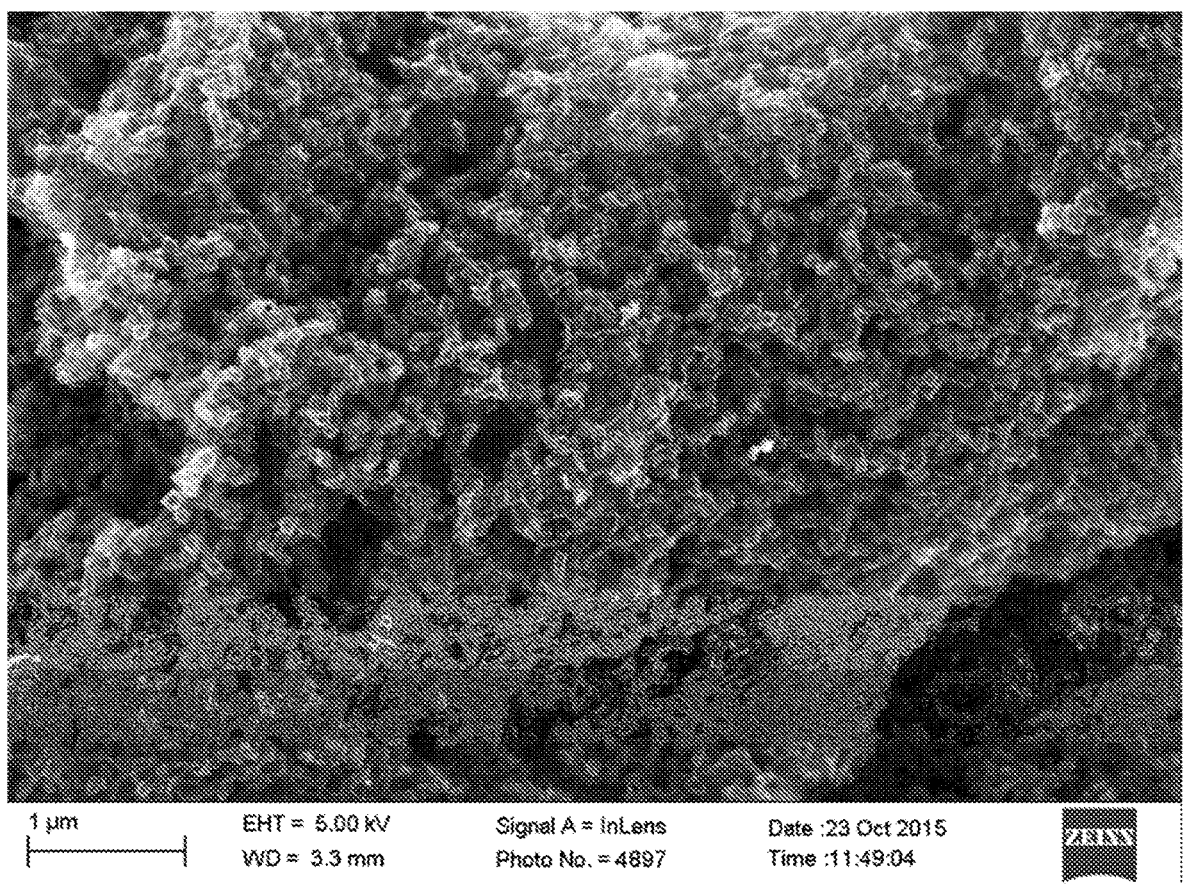
FIG. 19 is an SEM micrograph of the S3 carbon sample. This sample is comprised of individual cuboidal cells, each possessing a single endohedral cavity. The average cavity diameter is between 40 nm and 80 nm and the average cell wall thickness is less than 10 nm.
Figure 20:
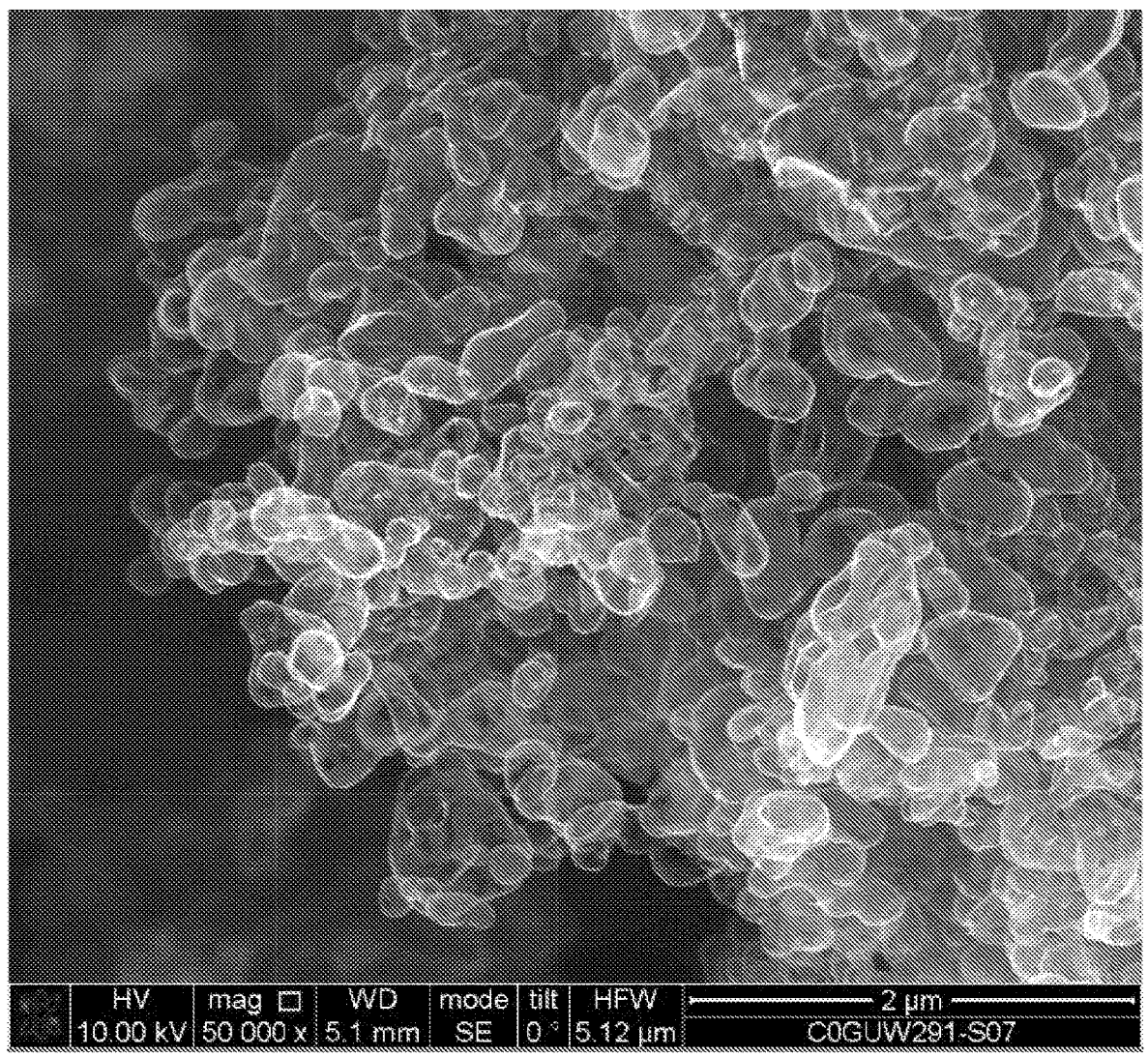
FIG. 20 is an SEM micrograph of the S2 carbon sample after high shear-mixing in an epoxy resin matrix and subsequent extraction via acetone rinsing. The S2 carbon structures comprised of defective carbon lattices exhibit more intactness than the carbon structures comprised of more crystalline carbon lattices. The S2 cells are still mostly intact after being mixed into the epoxy, as can be seen on the right-hand side of the micrograph. However, as shown on the left-hand side, there are also instances of degeneration.
Figure 21:
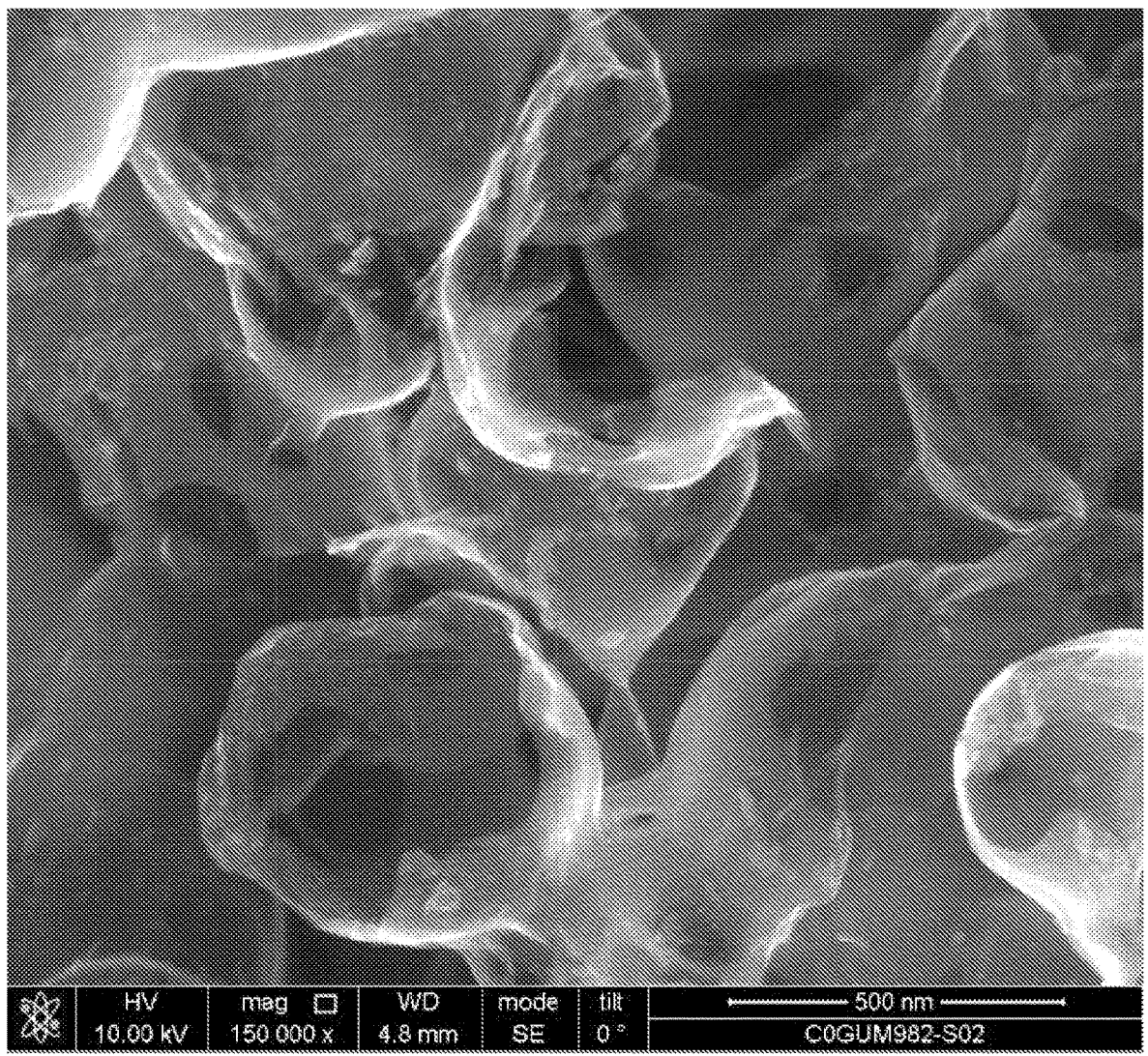
FIG. 21 is an SEM micrograph of the S4 carbon sample after the template extraction process.

SEM analysis was conducted on carbon cells grown and template-extracted using the S1, S2, and S3 procedures. The results for carbons grown using the S1 procedure are shown in FIG. 15. The results for carbons grown using the S2 procedure are shown in FIG. 14. The results for carbons grown using the S3 procedure are shown in FIG. 19. The results for carbons grown using the S4 procedure are shown in FIG. 20. The results for carbons grown using the S5 procedure are shown in FIG. 21.

Experiment A

One of the most promising uses for carbon nanostructures in polymers has been as toughening agents for brittle thermosetting polymers. The high aspect ratio, high surface area, and strength of low-dimensional carbons make them good candidates for a variety of thermosets. Unlike many other tougheners, carbon has been shown not to degrade the glass transition temperature of the polymer-important for high-temperature applications in industries like aerospace.

Cellular morphologies can be advantageous for toughening for several reasons. First, their architecture, due to its three-dimensional cavity encapsulated by two-dimensional walls, should enable cellular carbons to occupy, in effect, much larger volume fractions per unit carbon weight than other low-dimensional carbon fillers. The cellular structures described in the present disclosure are endohedrally impregnated by the matrix material, and as such the impregnated cells constitute a sort of nested nanocomposite filler within a nanocomposite. Secondly, cellular carbons and their derivatives tend to cluster into multicellular structures, resulting in a spatially diffuse reinforcing framework with both micro- and nano-scale features. This facilitates certain modes of toughening that are characteristic of microfillers in addition to the modes of toughening characteristic of nanofillers. For instance, theoretical models for micron-scale silica reinforcements suggest that crack pinning, particle bridging, microcracking, and crack deflection are the primary toughening mechanisms, while models for nanoscale reinforcements attribute toughening effects to particle debonding (with subsequent void growth) and associated shear-banding [14]. In particular, the debonding of high surface area nanostructures from the matrix dissipates fracture energy in toughened nanocomposites. Therefore, a filler that offers both micron-scale and nanoscale aspects ought to be attractive for toughening applications.

In order to compare thermosetting nanocomposites toughened with cellular morphologies vs. non-cellular morphologies, a model system was created using a two-part epoxy formulation. No chemical functionalization was introduced in order to offer the fairest comparison between the carbons on a purely morphological basis. Five nanocomposite samples in all were made and tested. A control epoxy sample was made with no carbon ("A0"). In order to control for effects due to lattice crystallinity, two cellular carbon samples (S1 and S2) with different degrees of crystallinity were chosen. The S1 carbon sample was comprised of a more crystalline carbon lattice structure, while the S2 carbon sample was comprised of a more defective carbon lattice structure. These carbons were then incorporated into two nanocomposite samples ("A1" and "A2" respectively).

The other carbon samples were chosen in order to balance a number of potential factors. First, it was desired to test carbons with both planar morphologies and non-planar morphologies. Second, it was desired to test carbons that included micron-scale particles, as well as carbons that included sub-micron particles. Third, it was desired to test carbons that contained oxygen moieties and also carbons that did not contain oxygen moieties. Fourth, it was desired to test carbons that were crystalline and also carbons that were defective. Lastly, it was desired to test carbons that contained equivalent or larger surface areas compared to the cellular carbons used. To facilitate these considerations as simply as possible, a commercial carbon black (Cabot Vulcan XC72R) sample and commercial graphene nanoplatelet (XG Science X-GNP-C-750) sample were chosen. Table 1 below shows a summary of the properties of these samples:

TABLE 1

Comparison of Carbons in Experiment A

| Sample ID | Particle Shape | Mass loss at 600° C. | Amorphous or Crystalline | SSA | |
|---|---|---|---|---|---|
| S1 | Curved fragments | <1.5% | Crystalline | 139 | $m^2/g$ |
| S2 | Spheroidal cells | <1.5% | Amorphous | 154 | $m^2/g$ |
| Vulcan XC72R | Spheroids [17] | <0.5% | Amorphous | 218 | $m^2/g$ [15] |
| X-GNP-C-750 | Nanoplatelets [16] | >6% | Mixed | 750 | $m^2/g$ [16] |

Figure 22:
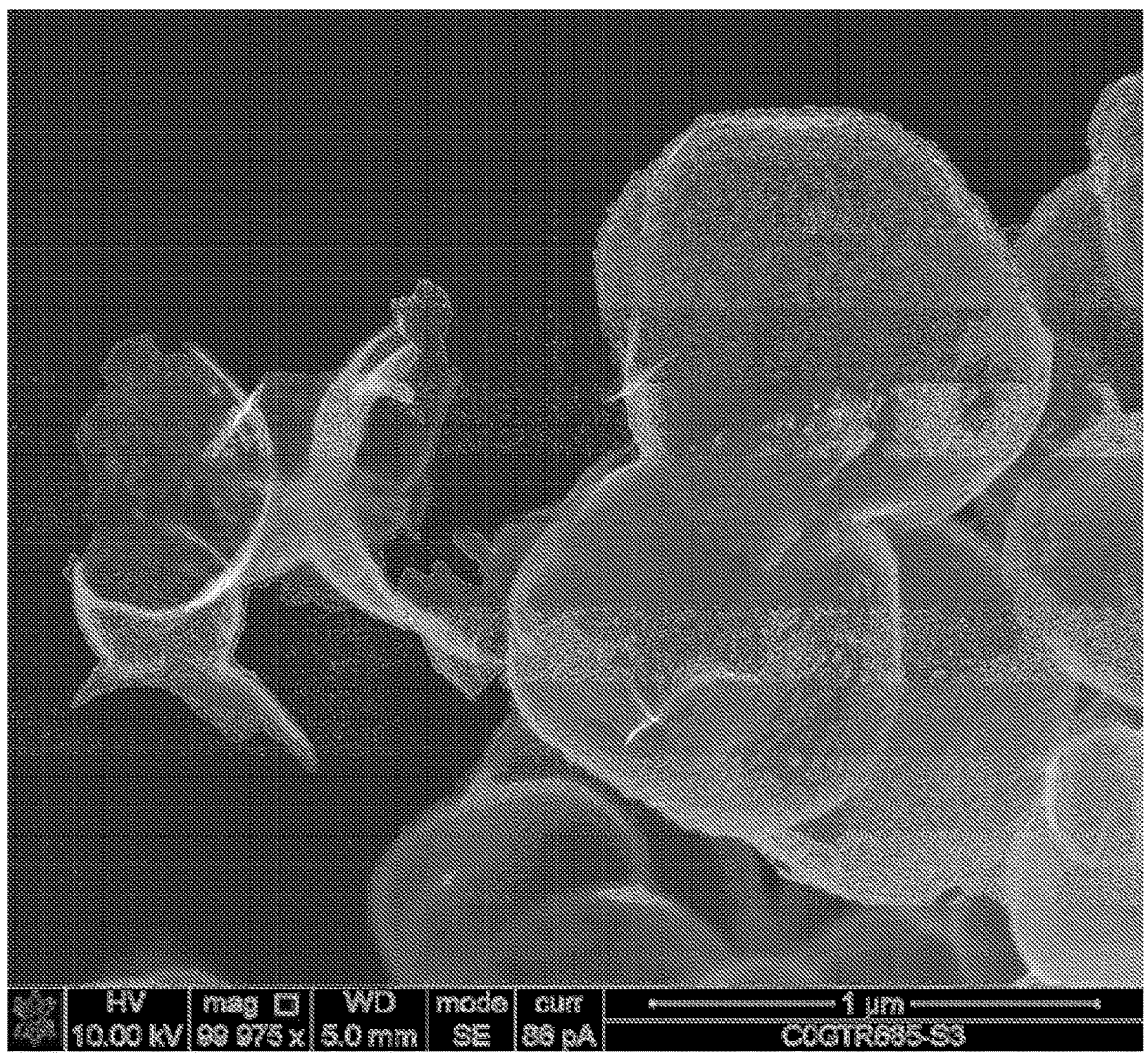
FIG. 22 is an SEM micrograph of the S5 carbon sample after the template extraction process.

The particle shapes of the cellular carbon samples in the nanocomposites were determined after making the A1 and A2 epoxy dispersions (according to the procedures described below) by extracting the S1 and S2 carbons via an acetone rinse, followed by SEM analysis. SEM analysis of the S1 carbons revealed curved fragments such as those found in FIG. 13. Defective or degenerate cell structures predominated over intact cell structures. On the other hand, SEM analysis of the S2 carbons revealed a generally intact cell population with some instances of fragmentation. FIG. 22 is a micrograph of the S2 carbons after acetone rinsing, and the intact cell structures that predominated can be observed on the right, while an example of the minority of degenerated cell structures can be observed on the left. The fragmented nature of the S1 carbons and the generally intact nature of the S2 carbons are consistent with the theoretical predictions of amorphous carbon lattices that are more ductile than crystalline carbon lattices. The particle shapes of the XC72R and X-GNP-C-750 were presumed to be unchanged by dispersion and are drawn from the literature and manufacturer's data sheet, respectively.

Figure 18:
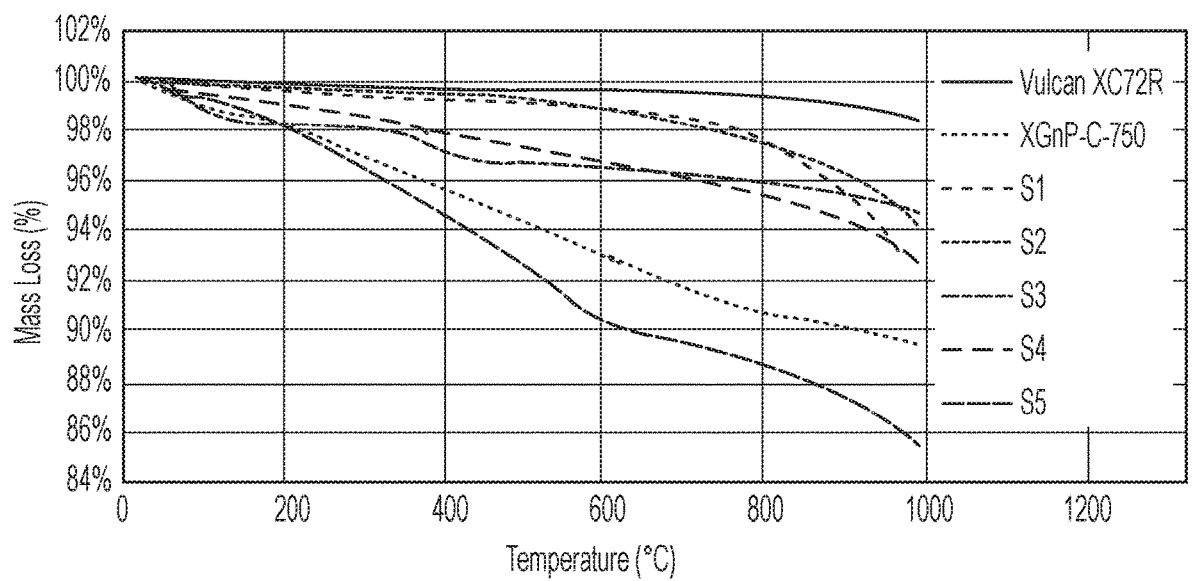
FIG. 18 shows TGA curves generated in an inert atmosphere under an argon flow of 100 mL/min and a heating rate of 10° C./min. The chart shows mass loss as a percentage of the initial sample mass vs. temperature for S1, S2, S3, S4, S5, XC72R, and XGNP-C-750. The mass loss below 600° C. is attributed primarily to elements other than carbon, such as oxygen.

Surface oxidation of the samples was estimated by subtracting the mass retained at 600° C. from the original mass, as measured using a TGA. The mass loss for XC72R and X-GNP-C-750, as shown in FIG. 18, is in reasonable agreement with the oxygen data for XC72R reported in the literature (0.3%) and the oxygen data for X-GNP-C-750 (greater than 6%) reported in the manufacturer's data sheet.

The crystalline structure of the S1 and S2 carbon samples was characterized using Raman spectra, as shown in FIG. 17. Due to the tectonic effects of CVD carbon growth, which involve subduction and quenching of lattice nuclei, the Raman spectra of cellular carbons like S1 reflect a composite of the spectral signals pertaining to the more crystalline outer strata of the cell wall and the spectral signals pertaining to the more defective (due to smaller lattices) inner strata. This amorphous background aside, the spectra for S1 indicate the presence of crystalline carbon in the outer strata, and it is therefore designated as crystalline. In S2, no crystalline signals are observed since, despite the emergence of larger lattices in the outer strata, these larger lattices contain in-plane defects. The Raman spectra of the XC-72R is not illustrated, but as expected reflected an amorphous carbon. The Raman spectra of the X-GNP-C-750 is also not illustrated, but can be found in the data sheet and confirms a relatively crystalline lattice structure. However, a guide to characterization provided by the spectrometer manufacturer indicates that the crystalline structure is difficult to ascertain via Raman due to the presence of both large and small nanoplatelets [18].

The samples' specific surface area was determined using BET analysis. While the surface area indicated by the manufacturer for X-GNP-C-750 is 750 $m^2/g$, the guide to characterization clarifies that this represents an average value drawn from a mixture of smaller (<100 nm), higher surface area nanoplatelets and larger (1-2 µm), lower surface area nanoplatelets. Therefore, in the nanocomposite, there are actually two phases of nanoplatelet fillers with significantly different surface areas.

Using these carbon samples, for each nanocomposite sample A1 through A4, a masterbatch was prepared at 1.33% carbon by weight in a 1:1 volume ratio pre-blend of Momentive Epon 828 ("828") and Huntsman Araldite LY1556 ("1556") difunctional epoxy resins. The carbons were dispersed using a high-shear rotor stator mixer at 15,000 rpm for 90 minutes, resulting in four masterbatch samples.

Each masterbatch sample was then diluted and mixed with the 828/1556 pre-blend in order to create a Part A resin dispersion. The carbon was loaded into the Part A dispersion such that the final carbon weight fraction of the nanocomposites after addition of the curing agent would be 0.3% (see table 1). The temperature of the masterbatch and the 828/1556 pre-blend during mixing was 60° C. Mixing was performed in a Thinky double planetary mixer for 3 minutes at 2,000 rpm and 25 kPa vacuum in order to remove any entrapped air.

Each resulting Part A sample was then blended with Part B (Aradur 34055 epoxy hardener, or "34055") in a two-step mixing process. Both A and B components were 35° C. during blending. In the first step, Part B was added to Part A under Cowles blade mixing at 1,100 rpm for 1.5 minutes.

This was followed by a second mixing step using the double planetary mixer for 3 minutes at 2,000 rpm and 25 kPa vacuum in order to remove any entrapped air.

Each resulting A+B mixture (at 40° C.+/−5° C.) was then poured into rectangular block molds that had been pre-treated with a mold release agent. These were allowed to gel at room temperature for 20 minutes, then transferred into a curing oven at 60° C. The samples then cured for 2 hours at 60° C., after which they were quickly removed from the molds and cured for another 2 hours at 60° C. The curing oven was then ramped up to 80° C. over 15 minutes. The samples were cured for 6 more hours at 80° C., then allowed to cool down to room temperature.

For A0, the epoxy sample without carbon, the 828/1556 pre-blend was heated to 35° C. Then, the 34055 hardener was added under Cowles blade mixing at 1,100 rpm for 1.5 minutes. The mixture was then blended in the double planetary mixer for 3 minutes at 2,000 rpm and 25 kPa vacuum to remove any entrapped air. The resulting mixture was then poured into the same pre-treated molds and subjected to the same gelation and curing cycle as nanocomposite samples A1 through A4. Table 2 below shows the weight ratios used for samples A0-A5:

TABLE 2

Experiment A Sample Composition

| Sample ID | Carbon type | Masterbatch (g) | Additional 828/1556 (g) | 34055 Hardener (g) |
|---|---|---|---|---|
| A0 | No carbon | 0 | 66 | 22 |
| A1 | S1 | 19.8 | 46.2 | 22 |
| A2 | S2 | 19.8 | 46.2 | 22 |
| A3 | Vulcan XC72R | 19.8 | 46.2 | 22 |
| A4 | XGnP-C-750 | 19.8 | 46.2 | 22 |

Each of the samples A0 through A4 was tested for fracture toughness ($K_c$) according to ASTM D 5045 using single-edge notched bending (SENB) specimens. To prepare the specimens, a vertical, transverse slit was machined into the center of the epoxy blocks. A razor blade was then inserted into the slit and tapped with a hammer until a crack was initiated at the bottom of the machined slit. The specimens dimensions were W=19.05 mm, L=83.82 mm, B=7.5 mm to 8.5 mm. The transverse slit had a depth of 4 mm, and the initiated crack was 3.6 mm to 7.4 mm in length, resulting in an "a" value between 7.6 to 11.4 mm, and an "a/W" value between 0.4 and 0.6. The specimens were mechanically tested on a hydraulic universal testing system with a SENB 3-point bending fixture supplied by Wyoming Test Fixtures and a 100 lb (445N) load cell. The universal testing system was operated at a constant crosshead speed of 10 mm per minute. The data was recorded using a National Instruments USB-6341 data acquisition system connected to a Windows PC. The dimensions of the specimens were measured with Mitutoyo digital calipers.

Table 3 below shows the results of the fracture toughness and tensile testing for samples A0 through A4.

TABLE 3

$K_{Ic}$ Results

| Sample | $K_{Ic}$ (MPa √m) | Improvement |
|---|---|---|
| A0 | 0.746 ± 0.055 | — |
| A1 | 0.976 ± 0.069 | 31% |

TABLE 3-continued $K_{Ic}$ Results

| Sample | $K_{Ic}$ (MPa √m) | Improvement |
|---|---|---|
| A2 | 0.887 ± 0.049 | 19% |
| A3 | 0.772 ± 0.034 | 3% |
| A4 | 0.761 ± 0.029 | 2% |

The results show that at the same weight loading, without any additional dispersing agents, and blended using the exact same mixing protocol, the S1 and S2 cellular morphologies improved the epoxy's toughness significantly more than the graphene nanoplatelets and carbon black. This result was achieved in spite of the elementary nature of the model formulation described herein, suggesting that even at low loadings and without any surface engineering, cellular carbons and their derivatives can provide significant toughening effects on brittle thermosets such as epoxy. This may be ascribed to their unique morphology.

Figure 23:
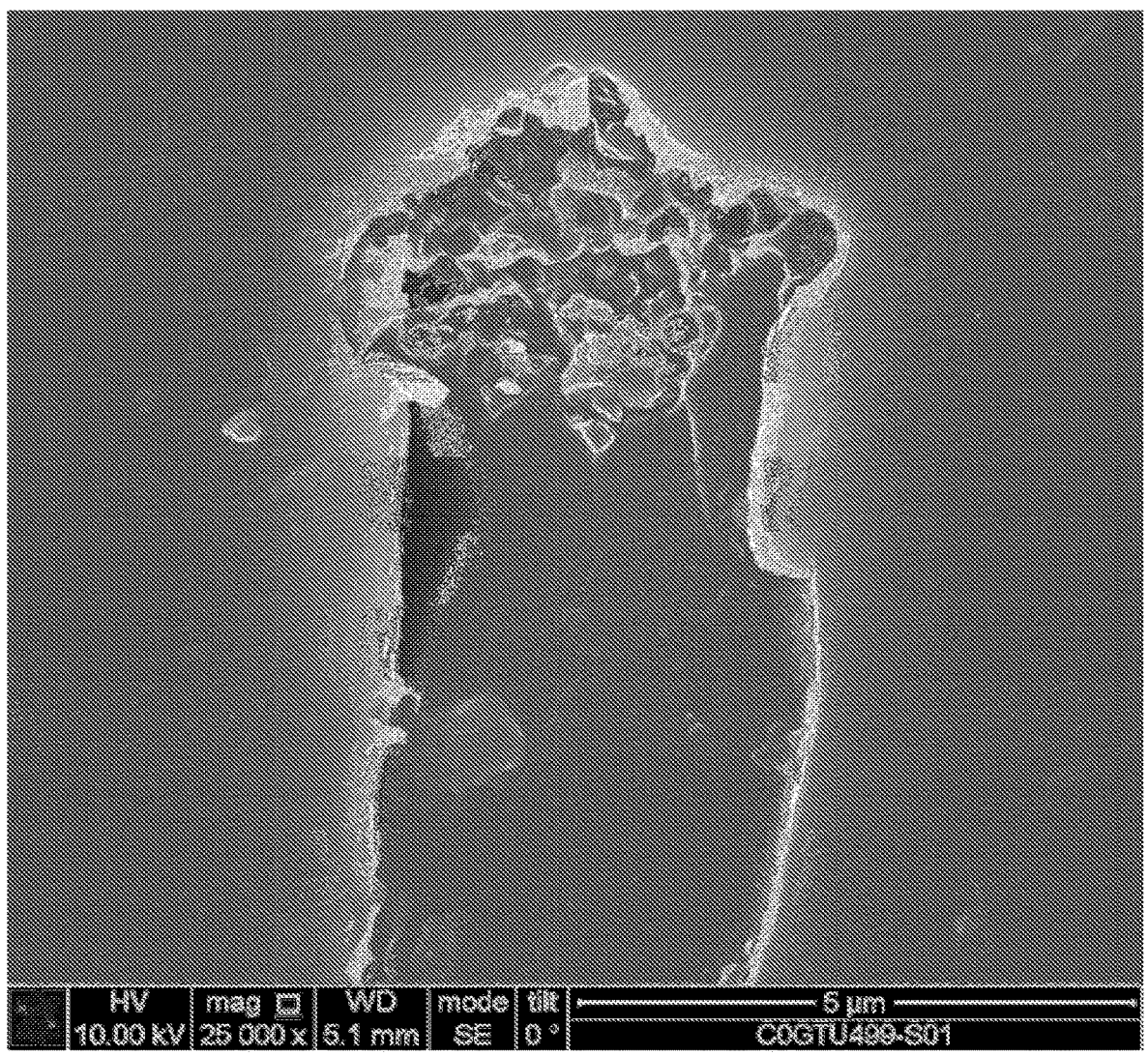
FIG. 23 is an SEM micrograph of the fracture surface from one of the epoxy nanocomposites made in Experiment A. In this image, a roughly 4 µm diameter cellular cluster can be observed. The cluster is formed via agglomeration of individual sub-micron particles in the epoxy resin, the location of which can be inferred by the spheroidal pullout patterns. Clusters such as this one have both micron-scale features and nanoscale features, which may be helpful for accessing different toughening mechanisms.

Fractographic analysis of both the A1 and A2 fracture surfaces indicates the presence of multicellular assemblies such as the one shown in FIG. 23. The individual subunits are submicron, but the assemblies range in size between 3 µm and 20 µm. As opposed to dense agglomerates, the assembly of cellular carbons is mostly of matrix material by volume due to impregnation of the cells.

Figure 24:
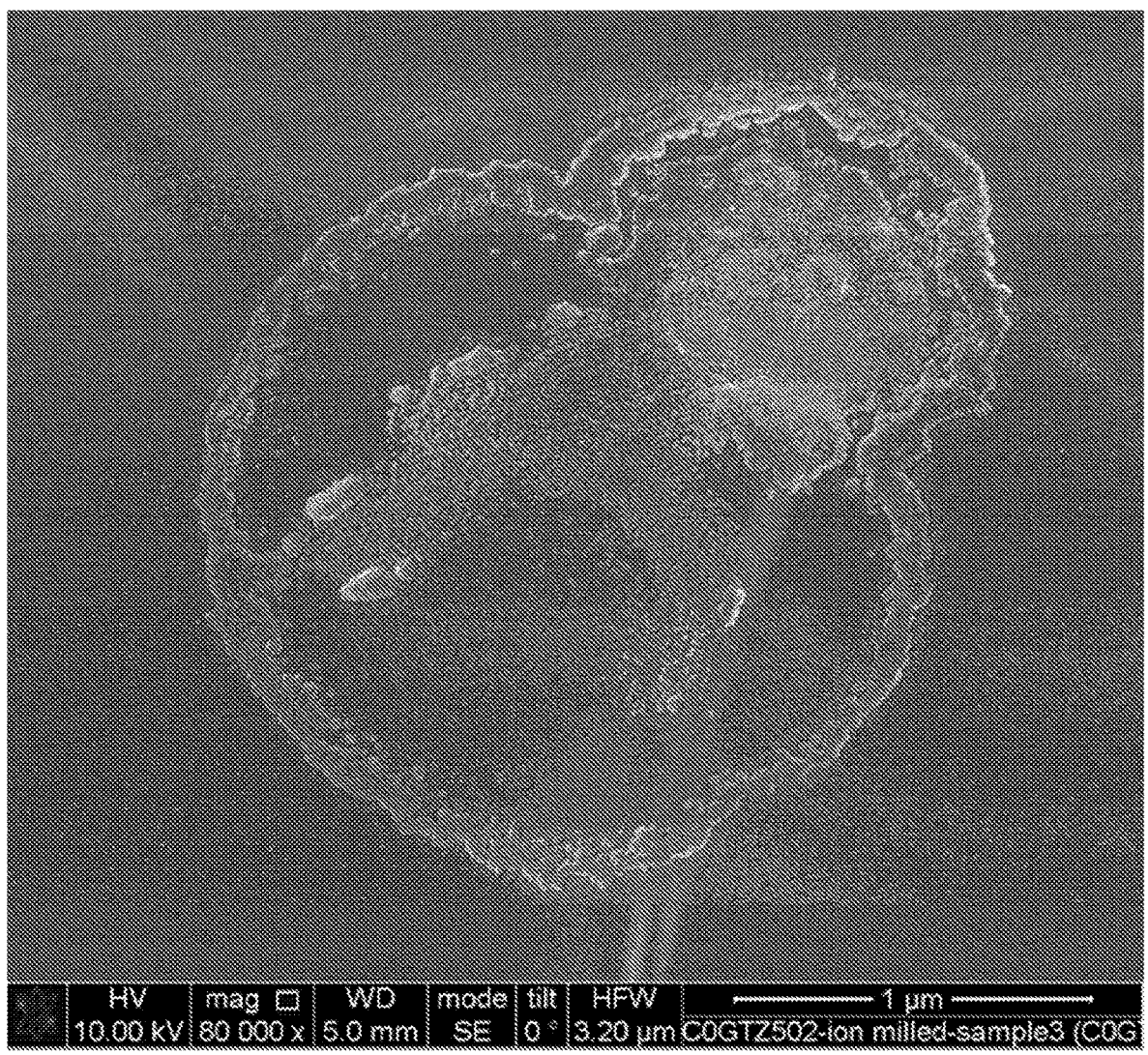
FIG. 24 is an SEM micrograph of an epoxy nanocomposite surface created by using a cryo-ion laser to mill the nanocomposite. In this nanocomposite sample, the milled surfaces were all smooth and exhibited little pitting resulting from cross-sectioning unimpregnated cavities. This particular micrograph shows a representative example of a cell structure observable within the epoxy matrix. The presence of this Figure-8-shaped cell structure can be deduced from the splotchy appearance of the endohedral epoxy. Whereas the exohedral epoxy shows no reaction to the cryo-ion laser, the internal phase was not stable when exposed to the laser's heat. Within the cavity, different regions can be deduced. Most clear is an unstable phase that hugs the endohedral surface of the cell wall.

Impregnation can be shown by creating a planar cross-section of the nanocomposite and searching for voids. FIG. 24 is an SEM micrograph of a representative cross-section produced by milling an A2-type sample with a cryo-ion laser. The milled surface is smooth, and the presence of a figure-8-shaped cell can be inferred in the center of the frame. It is clear from analysis of the milled surfaces of the nanocomposites described in Experiment A that there are no unimpregnated cavities, the cross-sections of which would be observable as pits in the milled surfaces. Thorough impregnation is to be expected given the openness of the degenerate cell structure, as well as the extensive, energetic blending of the liquid resin nanocomposites in successive stages of preparing the final nanocomposites.

Interestingly, though, SEM analysis of the cryo-ion milled surfaces of nanocomposites incorporating cellular structures that are mostly intact, such as A2, indicate the existence of phase differences between the inside and outside of cells, as can be observed in FIG. 24. Indeed, the outline of the cellular cross-section can only be discerned in FIG. 24 due to the splotchy appearance of a distinct, internal phase of incompletely crosslinked or plasticized epoxy that, unlike the surrounding epoxy matrix, is thermally unstable and apparently undergoes liquefaction when exposed to the cryo-ion laser.

The existence of such a phase is likely related to the degree of encapsulation of the generally intact S2 cells, as well as the relatively short pot life of the two-component epoxy system described in Experiment A. Prior to mixing the two reactive components together, the carbon likely has time to be infiltrated and wet out by the resin matrix. However, the blending time of the two reactive components is constrained by the rapid onset of the curing reaction. Given the blending constraints imposed by a polymer system with a short pot life, there may be insufficient time for the infiltrative and exfiltrative flows required to achieve complete equilibration inside and outside of the cells. In other words, the cellular envelope erects a barrier that prevents the materials inside the cell from rapidly equilibrating to the mixture outside the cell. Furthermore, isolation from the mixing effects of shear and turbulence in the surrounding fluid might give rise to localized, asynchronous crosslinking within the cellular envelope. For instance, crosslinking just inside the cell wall openings, where fluid exchange with the outer matrix occurs, might initiate more rapidly compared to regions deeper inside the cavity. Earlier onset of curing at these wall openings could further stifle equilibration by creating a bottleneck precisely where mass transfer is required. Asynchronous curing could also contribute to the apparent phase separation of the polymer in different regions within the cell cavity. One such distinct phase that can be found in all of the images like FIG. 24 is the splotchy region hugging the interior of the cell wall. This could occur due to the peripheralization of uncrosslinked liquid resin as crosslinking and solidification are occurring inside the bulk of the cavity. Alternatively, if solvents like acetone are used in the preparation of the cellular carbon powder, an insufficient drying process may not completely remove them from inside the cells. Regardless of the true mechanisms behind the formation of these internal phases, which are likely highly complex, it is not the object of this disclosure to be bound by theory.

The existence of a secondary, encapsulated polymer phase with lower crosslink density contained within a carbon cell is unique and has not been fully described within the literature. Such a composite structure could potentially be valuable for improving the mechanical properties of thermosetting polymers, especially their toughness and ability to elongate, due to the combined plasticity of the internal polymer phase and the lubricity of the carbon lattices within the wall. For instance, cellular carbon shells encapsulating a silicon core can accommodate over 200% volumetric expansions and contractions of the silicon inside during lithiation and dilithiation due to the carbon lattices' ability to slide over one another in response to tensile stress [19]. A mechanically similar "telescopic" pullout effect is known to occur in multiwall carbon nanotubes when the nanotube/matrix interface is strong enough to transfer mechanical stress to the outermost tubular lattice [20-21]. Given sufficient stress transfer between the cell's outermost lattices and the external polymer phase, along with sufficient stress transfer between the cell's innermost lattices and the plasticized internal polymer phase, a composite filler could be formed that could elongate or contract isotropically in response to complex local stresses. In order to obtain the best effects, the cellular carbon may need to be chemically functionalized for better bonding with the external matrix and internal polymer.

Experiment B

In addition to toughening epoxy, low-dimensional carbon nanostructures may improve tensile properties such as ultimate tensile strength and tensile modulus. Cellular carbon nanostructures, in particular, ought to offer tensile reinforcement to polymers, provided that the interface between the exohedral carbon surface and the polymeric matrix is sufficiently strong to allow stress transfer from the matrix to the carbon. However, if the interface is inadequate, cellular carbon nanostructures could be expected to perform worse than nanoplatelets and nanotubes, and indeed worse than the polymer itself. This is because of the three-dimensionality of the cells. If, for example, a nanoplatelet is poorly bonded to the matrix, such that the interface fails under tensile stress, the polymer may delaminate from the carbon, forming a 2D crack. If, on the other hand, a 10 μm multicellular assembly is poorly bonded to the matrix, such that the interface fails under tensile stress and the polymer delaminates from the cluster, a discontinuity in the polymer is formed that tracks the size and shape of the cluster. The effect, in other words, is to introduce a 10 m, three-dimensional discontinuity into the matrix—in essence, a void in which the carbon cluster is resting, but which offers no reinforcement or connectivity. The more highly loaded the sample is with carbon assemblies, the more discontinuities are introduced, and the tensile properties should degrade progressively.

In order to alleviate this concern, it was desired to test nanocomposites in which the cellular carbons were chemically functionalized. The S4 and S5 cellular carbons were selected to create the nanocomposite samples. A multifunctional (>2) epoxy system was selected to determine if the cellular carbons could improve on a system with higher cross linking density, which is commonly utilized in automotive, aerospace, and other demanding applications that require greater dimensional stability and glass transition temperature throughout the polymer's service life.

Using the S4 and S5 carbon samples, two masterbatches were prepared at 1.33% carbon by weight in an epoxy resin pre-blend. The pre-blend was comprised of difunctional Momentive Epon 828 ("828") resin at 35% concentration by weight, difunctional Momentive Epon 862 ("862") at 35% concentration by weight, and 30% tetrafunctional Huntsman Araldite LY9721 ("9721") concentration by weight. The carbons were dispersed using a high-shear rotor stator mixer at 15,000 rpm for 90 minutes, resulting in two masterbatch samples.

Each masterbatch sample was then diluted and mixed with the 828/862/1556 pre-blend in order to create a Part A resin dispersion. The carbon was loaded into the Part A dispersion such that the final carbon weight fraction of the nanocomposites after addition of the curing agent would be 0.5% and 0.3% for B1 and B2, respectively (see Table 4). The temperature of the masterbatch and the 828/862/9721 pre-blend during mixing was 70° C. Mixing was performed in a Thinky double planetary mixer for 3 minutes at 2,000 rpm and 25 kPa vacuum in order to remove any entrapped air.

Each resulting Part A sample was then blended with Part B (Aradur 3473 epoxy hardener, or "3473") in a two-step mixing process. In the first step, room temperature (25° C.) Part B was added to Part A (approximately 60° C.) under Cowles blade mixing at 1,100 rpm for 1.5 minutes. This was followed by a second mixing step using the double planetary mixer for 3 minutes at 2,000 rpm and 25 kPa vacuum in order to remove any entrapped air. Each resulting A+B mixture (at 45° C.+/−5° C.) was then poured into rectangular molds that had been pre-treated with a mold release agent and pre-heated to 60° C. The samples then cured for 2 hours at 120° C., 2 hours at 160° C., 2 hours at 200° C., and finally 4 hours at 220° C. The samples were then allowed to cool down to room temperature. Once cooled, the samples were removed from the molds and cut into tensile testing specimens using a CNC mill.

For B0, the control sample without carbon, the 828/862/9721 pre-blend was heated to 60° C. Then, the 3473 hardener (at 25° C.) was added under Cowles blade mixing at 1,100 rpm for 1.5 minutes. The mixture was then blended in the double planetary mixer for 3 minutes at 2,000 rpm and 25 kPa vacuum to remove any entrapped air. The resulting mixture was then poured into the same pre-treated, pre-heated molds and subjected to the same curing cycle as nanocomposite samples B1 and B2.

Table 4 below shows the weight ratios used for samples B0-B2:

TABLE 4

Experiment B Sample Composition

| Sample ID | Carbon type | Masterbatch (g) | Additional 828/862/9721 (g) | 3473 Hardener (g) |
|---|---|---|---|---|
| B0 | No carbon | 0 | 160 | 46.4 |
| B1 | S4 | 77.6 | 82.4 | 46.4 |
| B2 | S5 | 46.5 | 113.4 | 46.4 |

Tensile testing was performed according to ASTM D638 using Type IV specimen dimensions. The tensile specimens were mechanically tested on a hydraulic universal testing system with an Epsilon 3542 extensometer and a 500lb (2224N) load cell. The universal testing system was operated at a constant crosshead speed of 5 mm per minute. The data was recorded using a National Instruments USB-6341 data acquisition system connected to a Windows PC. The dimensions of the specimens were measured with Mitutoyo digital calipers.

Table 5 below shows the average ultimate tensile strength (UTS), average tensile modulus, and average elongation at break values for each sample type:

TABLE 5

Tensile Testing Results

| Sample ID | Carbon type | Carbon weight fraction | UTS (MPa) | Tensile modulus (MPa) | Elongation at break (%) |
|---|---|---|---|---|---|
| B1 | None | 0.0% | 72.4 | 2882 | 3.8% |
| B2 | S4 | 0.3% | 82.4 | 2966 | 4.4% |
| B3 | S5 | 0.5% | 79.9 | 3073 | 4.1% |

For each of the functionalized cellular carbon samples, all three tensile properties were improved over the multifunctional epoxy baseline. This is especially notable since polymer nanocomposites reinforced with low-dimensional carbons generally show significantly reduced elongation at break. It is expected that optimization of the surface chemistry, blending procedure, loading level, and other factors would further improve the tensile data over the model nanocomposite system disclosed herein.

Experiment C

Cellular carbon architectures can be advantageous for improving the mechanical properties of polymers and may also enhance electrical conductivity at low-weight fractions due to the creation of a multicellular percolating network. A model system was created using a two-part epoxy formulation. Nine nanocomposite samples (C1-C9) in all were made using S1 cellular carbon, Cabot Vulcan XC72R, and XG Science X-GNP-C-750 at different carbon loading levels and tested for sheet resistance.

First, three masterbatch samples—one for each type of carbon—were prepared at 1.33% carbon by weight in a 1:1 volume ratio pre-blend of Epon 828 ("828") and Araldite LY1556 ("1556") difunctional epoxy resins. The carbons were dispersed using an IKA high-shear rotor stator mixer at 15,000 rpm for 90 minutes.

Each masterbatch was then diluted and mixed with the 828/1556 pre-blend in order to create three Part A resin dispersions. The carbon was loaded into the Part A dispersions such that the final carbon weight fraction of the nanocomposites after addition of the curing agent would be 0.3%, 0.6%, and 0.9% by weight (see table 1). The temperature of the masterbatch and the 828/1556 pre-blend during mixing was 60° C. Mixing was performed in a Thinky double planetary mixer for 3 minutes at 2,000 rpm and 25 kPa vacuum in order to remove any entrapped air.

Each resulting Part A sample was then blended with Part B (Aradur 34055 epoxy hardener, or "34055") in a two-step mixing process. Both A and B components were 35° C. during blending. In the first step, Part B was added to Part A under Cowles blade mixing at 1,100 rpm for 1.5 minutes. This was followed by a second mixing step using the double planetary mixer for 3 minutes at 2,000 rpm and 25 kPa vacuum in order to remove any entrapped air.

Each resulting A+B mixture (at 40° C.+/−5° C.) was then poured into rectangular block molds that had been pre-treated with a mold release agent. These were allowed to gel at room temperature for 20 minutes, then transferred into a curing oven at 60° C. The samples then cured for 4 hours at 60° C. The curing oven was then ramped up to 80° C. over 15 minutes. The samples were cured for 6 more hours at 80° C., then allowed to cool down to room temperature and removed from the molds.

The samples were then sanded on their bottom surface (the surface in contact with the mold) with 600 grit sandpaper to expose the nanocomposite free of any surface contamination. Then, silver conductive paint was applied in two parallel lines, 1 cm long, spaced 1 cm apart from each other, to create busbars for measurement of ohms/square. Once the silver paint was completely dry, the specimens were tested using a two-wire multimeter probe set for electrical resistance measurement (ohms). The specimens were tested with one probe attached to each silver busbar.

Table 6 below shows the sample composition and results for the nanocomposite samples made in Experiment C.

TABLE 6

Sample Composition and Sheet Resistance

| Sample ID | Carbon type | Carbon weight fraction | Masterbatch (g) | Additional 828/1556 (g) | 34055 Hardener (g) | $R_s$ ($\Omega$/sq) |
|---|---|---|---|---|---|---|
| C1 | S3 | 0.3% | 19.8 | 46.2 | 22 | $2.52 \times 10^7$ |
| C2 | S3 | 0.6% | 39.6 | 26.4 | 22 | $2.45 \times 10^4$ |
| C3 | S3 | 0.9% | 59.4 | 6.6 | 22 | $1.05 \times 10^4$ |
| C4 | XC72R | 0.3% | 19.8 | 46.2 | 22 | N.R. |
| C5 | XC72R | 0.6% | 39.6 | 26.4 | 22 | N.R. |
| C6 | XC72R | 0.9% | 59.4 | 6.6 | 22 | $1.79 \times 10^8$ |
| C7 | XGnP-C-750 | 0.3% | 19.8 | 46.2 | 22 | N.R. |

TABLE 6-continued

Sample Composition and Sheet Resistance

| Sample ID | Carbon type | Carbon weight fraction | Masterbatch (g) | Additional 828/1556 (g) | 34055 Hardener (g) | $R_s$ (Ω/sq) |
|---|---|---|---|---|---|---|
| C8 | XGnP-C-750 | 0.6% | 39.6 | 26.4 | 22 | N.R. |
| C9 | XGnP-C-750 | 0.9% | 59.4 | 6.6 | 22 | N.R. |

In terms of electrical conductivity, C1 and C6 are classifiable as an electrostatic dissipative material (i.e., $10^6$ to $10^{12}$ Ω/sq), while C2 and C3 are classifiable as conductive materials (i.e., $10^1$ to $10^6$ Ω/sq). All specimens for which $R_S$ is cited as "N.R." were not conductive enough to obtain a conductivity measurement using the two-wire multimeter probe.

The overall results show that cellular carbons greatly outperform both the XC72R carbon black and XGnP-C-750 graphene nanoplatelets using this simple blending process in a model formulation. This performance is encouraging since the cost of producing cellular carbons using processes like the one disclosed herein, combined with MgO template recycling, is theoretically much lower than the manufacturing cost of nanoplatelets or nanotubes. Moreover, the S3 samples are comprised of discrete, nanocellular particles, whereas some cellular carbon may be much larger and have much higher aspect ratio particle structures. As an example, nanoarchitected carbon foams with fibrous or sheet-like morphologies may be highly conductive based on their aspect ratio.

Applications for cellular carbon-filled thermosetting nanocomposites may be numerous, including printed electronics, multifunctional paints, sensors, conductive composites, and more. Multifunctional combination of enhanced mechanical properties and electrical conductivity may be beneficial in some applications, such as composites with piezoresistive sensing capabilities.

Experiment D

In addition to thermosetting polymers, thermoplastics may benefit from electrical conductivity in a number of applications, especially conductive coatings. To demonstrate the ability of cellular carbon nanostructures to impart conductivity to thermoplastics, a model system was created using a chlorinated polyolefin ("CPO"). CPO is commonly used as an electrically conductive primer for automotive plastics such as polycarbonates, polyesters, polypropylene, polyurethanes, polyamides, or blends. These conductive coatings allow manufacturers to apply paints and coatings by electrostatic methods unto plastic parts thus increasing transfer efficiency. Three nanocomposite samples (D1-D4) in all were made, applied as coatings and tested for sheet resistance.

A masterbatch carbon dispersion was first prepared by combining 0.75 grams of S3 carbon with a pre-blend of 0.75 grams of a dispersant (Byk Chemie, BYK-145) and 98.5 grams of toluene. The toluene and BYK-145 were pre-blended in a 120 ml wide-mouth glass jar with a magnetic stirrer bar and magnetic stirrer at approximately 200 rpm for 10 minutes. The S3 powder was added to the pre-blend and stirred for 30 minutes. The jar was then covered and placed in a Branson 3510 Sonication bath for 1 hour, after which it was reopened and placed back on the magnetic stirrer at 400 rpm. An ultrasonic probe with ½" tip was then submerged 1 inch below the liquid surface. The probe, which was attached to a Sonics Vibra-Cell controller, was run at 60% amplitude until a total energy reading of 75 kilojoules was reached.

The masterbatch dispersion was then mixed with CPO solution to obtain four samples (D1-D4) of 1%, 2%, 5%, and 10% by weight S3:CPO solids (see table 3). The CPO is Eastman 730-1 20% CPO in xylene. The dispersions and CPO solutions were mixed using a magnetic stirrer for 30 minutes at 400 rpm, then bath sonicated for 1 hour, then magnetically stirred again for an additional 15 minutes at 400 rpm.

Each coating was applied to PET film (0.007" DuPont Melinex 453) by pipette, forming round coatings of various thicknesses. The coatings were then oven-dried at 60° C. for 2 hours and allowed to sit at room temperature overnight before testing. Sample thickness was measured using a Model 89-100 Thickness Tester manufactured by the Thwing-Albert Instrument Company. For comparative testing of electrical sheet resistance, a 40 um dried film thickness (dft) was used for each sample (see table 2 for results). Sheet resistance was measured with a Keithly 2400 SourceMeter 4-point probe.

Table 7 below shows the sample composition and measured sheet resistance for the nanocomposite samples made in Experiment D.

TABLE 78

Sample Composition and Sheet Resistance

| Sample ID | S3 weight fraction | Masterbatch solids (g) | CPO solids (g) | $R_s$ (Ω/sq) |
|---|---|---|---|---|
| D1 | 1.0% | 2.5 | 9.3 | $1.7 \times 10^6$ |
| D2 | 2.0% | 5.0 | 9.0 | $2.0 \times 10^4$ |
| D3 | 5.0% | 10.0 | 6.8 | 185 |
| D4 | 10.0% | 10.0 | 3.5 | 63 |

Experiment E

A common application for which low-dimensional carbon nanostructures have been investigated is electrically conductive thin films for electronic displays, anti-fog films for automobile windows, and sensors for a variety of applications. The following example shows the potential for these novel carbon structures formulated into ink that produces conductive thin films.

A solution for dispersing the carbon was prepared by mixing 11 grams of DI water and 5.5 grams ethanol (technical grade) in a 20 ml glass scintillation vial. A modified urea (BYK Chemie GmbH BYK-420) was then added, and the mixture was bath-sonicated for 1 hour. Then, 0.47 gram of Evonik TEGO Dispers 760 W, a dispersing additive, was added and magnetically stirred for 15 minutes.

Next, 0.3 gram of S3 carbon was added to the mixture. The mixture was then magnetically stirred for 30 minutes, followed by bath sonication for 1 hour. The vial was placed in a water/ice bath. A high shear IKA immersion mixer (Ultra-Turrax T25) with an 8 G mixing generator was then immersed in the mixture 1 inch. The sample was then mixed at 20 k min.−1 for 1 hour, replenishing the ice in the water bath to keep the mixture from overheating (approx. <60° C.).

Next, while magnetically stirring the sample at 200 rpm, an ultrasonic probe with ½" tip was immersed 1 cm below the surface. The probe, attached to a Sonics Vibra-Cell controller, was run at 20% amplitude until a total energy reading of 4.5 kilojoules was reached. To control foaming, 0.05 gram of a 5% solution of DuPont Capstone FS-63 fluoro-surfactant in a 1:1 solution of DI water and ethanol was added. The ultrasonication was continued until a total of 13.5 kilojoules was reached, while again adding ice to the water bath to keep the sample below approx. 60° C.

The resulting ink was applied to PET film (0.007" DuPont Teijin Melinex 453) by pipette and then spread into a very thin, wet film using Meyer Rod RDS8. The wet film was placed in a 120° C. oven for 1 hour to dry the film thoroughly.

The dry film was tested the following day. Total transmission was measured to be 64.5% at a 550 nm wavelength, using a Thermo Scientific Evolution 60S UV-Visible Spectrophotometer. The transmission of the bare substrate reading was 88%, indicating a carbon coating transmission of 73% at 550 nm. Sheet resistance was measured using a 4-point probe (Guardian Industries model SRM232-1000). The average sheet resistance was measured to be 698 ohms/sq.

Embodiments

The processes and materials demonstrated herein have many potential embodiments. Cellular carbon nanostructures formed using templates (e.g., oxide templates) of any suitable size, morphology, and surface chemistry may be used. Any carbonaceous precursor capable of being converted into carbon may be used as the carbon source. In embodiments involving chemical vapor deposition, various carrier gases may be used in combination with the precursor gases. Various gas pressures, temperatures, flow rates, reaction times, and reactor types may be used. Templated carbons may be grown using multiple CVD reactions, including post-extraction autocatalyzed reactions. Cellular carbon nanostructures may be covalently or noncovalently chemically functionalized, including functionalization with oxygen groups resulting from exposure to various oxidizing agents. Numerous permutations of these process parameters, including those not demonstrated herein, can be used in various embodiments of the invention.

One embodiment includes a dispersion of carbon nanostructures in a liquid matrix phase. The matrix phase comprises one or more of monomer, resin, prepolymer, polymer, curing agent, catalyst, and solvent. The carbon nanostructures have a cellular structure, including cavities, each cavity being substantially enclosed by one or more walls of the cellular structure. A majority of the cavities have a diameter of 10 nm or larger. A majority of the cavities are endohedrally impregnated by either a liquid or solid, the chemical composition of which may be similar to or different from the exohedral matrix.

Another embodiment includes a nanocomposite of carbon nanostructures in a liquid matrix phase. The matrix phase comprises one or more of monomer, resin, prepolymer, polymer, curing agent, and catalyst. The carbon nanostructures have a cellular structure, including cavities, each cavity being substantially enclosed by one or more walls of the cellular structure. A majority of the cavities have a diameter of 10 nm or larger. A majority of the cavities are endohedrally impregnated by either a liquid or solid, the chemical composition of which may be similar to or different from the exohedral matrix.

The following embodiments, numbered consecutively from 1 through 47, provide a non-exhaustive list of various embodiments described herein.

Embodiment 1: a dispersion, comprising: a liquid matrix phase, the liquid matrix phase comprising one or more of monomer, resin, prepolymer, polymer, curing agent, and catalyst; and nanostructured carbons dispersed in the liquid matrix phase, the nanostructured carbons having a cellular structure comprising: one or more walls having a structure formed by a template; one or more cavities, each cavity: substantially enclosed by the one or more walls; and impregnated by a portion of the matrix phase.

Embodiment 2: the dispersion of embodiment 1, wherein: a majority of the one or more walls have a thickness of 100 nm or smaller; a majority of the one or more cavities have: a diameter of 10 nm or larger; one of: a linear structure and an aspect ratio of less than 10:1; a non-linear structure and an aspect ratio of greater than 10:1; or a non-linear structure and an aspect ratio of less than 10:1; and a majority of the cellular structures have a diameter of 1 mm or smaller.

Embodiment 3: the dispersion of any one of embodiments 1 and 2, wherein the structure of the one or more walls has been physically or chemically altered to differ from the structure formed by the template.

Embodiment 4: the dispersion of embodiment 3, wherein the physical alteration fragments or deforms the structure of the one or more walls.

Embodiment 5: the dispersion of embodiment 4, wherein deforming the structure substantially collapses the one or more cavities.

Embodiment 6: the dispersion of any one of embodiments 1-5, wherein a portion of the nanostructured carbons comprise unicellular particles.

Embodiment 7: the dispersion of any one of embodiments 1-6, wherein a portion of the nanostructured carbons comprise multicellular particles.

Embodiment 8: the dispersion of any one of embodiments 1-7, wherein the matrix phase further comprises a solvent.

Embodiment 9: the dispersion of any one of embodiments 1-8, wherein the matrix phase comprises a thermoplastic polymer.

Embodiment 10: the dispersion of any one of embodiments 1-9, wherein the matrix phase comprises an epoxy-functional resin.

Embodiment 11: the dispersion of any one of embodiments 1-10, wherein the matrix phase comprises one or more curing agents selected from the following list: amines, phenols, thiols, Lewis acids or acid anhydrides.

Embodiment 12: the dispersion of any one of embodiments 1-11, wherein the matrix phase comprises a polyolefin or modified polyolefin.

Embodiment 13: the dispersion of any one of embodiments 1-12, wherein the matrix phase comprises urea or modified urea.

Embodiment 14: the dispersion of any one of embodiments 1-13, wherein a portion of the nanostructured carbons exhibit a Raman 2-D/G peak intensity ratio of 0.40 or lower.

Embodiment 15: the dispersion of any one of embodiments 1-14, wherein a portion of the nanostructured carbons exhibit a Raman 2-D/G peak intensity ratio of 0.20 or lower.

Embodiment 16: the dispersion of any one of embodiments 1-15, wherein a portion of the nanostructured carbons are synthesized via template-directed chemical vapor deposition.

Embodiment 17: the dispersion of any one of embodiments 1-16, wherein the template-directed chemical vapor deposition process is performed at a temperature below 800° C.

Embodiment 18: the dispersion of any one of embodiments 1-17, wherein a portion of the nanostructured carbons are functionalized with chemical functional groups.

Embodiment 19: the dispersion of embodiment 18, wherein the chemical functional groups are covalently bonded to the nanostructured carbons.

Embodiment 20: the dispersion of embodiment 19, wherein the chemical functional groups are oxygen functional groups.

Embodiment 21: the dispersion of any one of embodiments 1-20, wherein the cavities are at least partially filled with a component that is chemically distinct from the matrix.

Embodiment 22: an ink, comprising: a liquid matrix phase, the liquid matrix phase comprising two or more of monomer, resin, prepolymer, polymer, curing agent, catalyst, and solvent; and nanostructured carbons dispersed in the liquid matrix phase, the nanostructured carbons having a cellular structure comprising: one or more walls having a structure formed by a template; one or more cavities, each cavity: substantially enclosed by the one or more walls; and impregnated by a portion of the matrix phase.

Embodiment 23: an additive for modifying a property of a material, the additive comprising: a liquid matrix phase, the liquid matrix phase comprising one or more of monomer, resin, prepolymer, polymer, curing agent, and catalyst; and nanostructured carbons dispersed in the liquid matrix phase, the nanostructured carbons having a cellular structure comprising: one or more walls having a structure formed by a template; one or more cavities, each cavity: substantially enclosed by the one or more walls; and impregnated by a portion of the matrix phase.

Embodiment 24: the additive of embodiment 23, wherein the property is a mechanical or an electrical property.

Embodiment 25: a nanocomposite, comprising: a solid matrix phase, the solid matrix phase comprising one or more of monomer, resin, prepolymer, polymer, curing agent, and catalyst; and nanostructured carbons embedded in the solid matrix phase, the nanostructured carbons having a cellular structure comprising: one or more walls having a structure formed by a template; one or more cavities, each cavity: substantially enclosed by the one or more walls; and impregnated by a portion of the matrix phase.

Embodiment 26: the nanocomposite of embodiment 25, wherein: a majority of the one or more walls have a thickness of 100 nm or smaller; a majority of the one or more cavities have: a diameter of 10 nm or larger; one of: a linear structure and an aspect ratio of less than 10:1; a non-linear structure and an aspect ratio of greater than 10:1; or a non-linear structure and an aspect ratio of less than 10:1; and a majority of the cellular structures have a diameter of 1 mm or smaller.

Embodiment 27: the nanocomposite of any one of embodiments 25-26, wherein the structure of the one or more walls has been physically or chemically altered to differ from the structure formed by the template.

Embodiment 28: the nanocomposite of embodiment 27, wherein the physical alteration fragments or deforms the structure of the one or more walls.

Embodiment 29: the nanocomposite of embodiment 28, wherein deforming the structure substantially collapses the one or more cavities.

Embodiment 30: the nanocomposite of any one of embodiments 25-29, wherein a portion of the nanostructured carbons comprise unicellular particles.

Embodiment 31: the nanocomposite of any one of embodiments 25-30, wherein a portion of the nanostructured carbons comprise multicellular particles.

Embodiment 32: the nanocomposite of any one of embodiments 25-31, wherein the polymer comprises a thermoplastic polymer.

Embodiment 33: the nanocomposite of any one of embodiments 25-32, wherein the polymer comprises a thermosetting polymer.

Embodiment 34: the nanocomposite of embodiment 33, wherein the thermosetting polymer is partially cured.

Embodiment 35: the nanocomposite of any one of embodiments 33-34, wherein the thermosetting polymer comprises epoxy.

Embodiment 36: the nanocomposite of embodiment 35, wherein the epoxy comprises diglycidyl ether of Bisphenol A.

Embodiment 37: the nanocomposite of any one of embodiments 25-36, wherein the nanocomposite exhibits at least one of an increased ultimate tensile strength, an increased tensile modulus, an increased elongation at break, an increased GIC critical strain energy release rate, an increased ultimate flexural strength, an increased flexural modulus, an increased ultimate compressive strength, an increased compressive modulus, an increased hardness, or an increased impact strength over that of the material comprising the matrix phase.

Embodiment 38: the nanocomposite of any one of embodiments 25-37, wherein the nanocomposite exhibits an increased KIC fracture toughness over that of the material comprising the matrix phase.

Embodiment 39: the nanocomposite of any one of embodiments 25-38, wherein the nanocomposite exhibits an increased electrical conductivity over that of the material comprising the matrix phase.

Embodiment 40: the nanocomposite of any one of embodiments 25-39, wherein a portion of the nanostructured carbons are functionalized with chemical functional groups.

Embodiment 41: the nanocomposite of embodiment 40, wherein the chemical functional groups are covalently bonded to the nanostructured carbons.

Embodiment 42: the nanocomposite of any one of embodiments 40-41, wherein the chemical functional groups are oxygen functional groups.

Embodiment 43: the nanocomposite of any one of embodiments 25-42, wherein the cavities are at least partially filled with a component that is chemically distinct from the matrix.

Embodiment 44: the nanocomposite of any one of embodiments 25-43, further comprising a fibrous reinforcement phase.

Embodiment 45: the nanocomposite of any one of embodiments 25-44, wherein the fibrous reinforcement phase comprises chopped fiber.

Embodiment 46: a film or coating, comprising: a solid matrix phase, the solid matrix phase comprising one or more of monomer, resin, prepolymer, polymer, curing agent, and catalyst; and nanostructured carbons dispersed in the solid matrix phase, the nanostructured carbons having a cellular structure comprising: one or more walls having a structure formed by a template; one or more cavities, each cavity:

substantially enclosed by the one or more walls; and impregnated by a portion of the matrix phase.

Embodiment 47: a molded casting, comprising: a solid matrix phase, the solid matrix phase comprising one or more of monomer, resin, prepolymer, polymer, curing agent, and catalyst; and nanostructured carbons dispersed in the solid matrix phase, the nanostructured carbons having a cellular structure comprising: one or more walls having a structure formed by a template; one or more cavities, each cavity: substantially enclosed by the one or more walls; and impregnated by a portion of the matrix phase.

Reference to phrases "less than," "greater than," "at most," "at least," "less than or equal to," "greater than or equal to," or other similar phrases followed by a string of values or parameters is meant to apply the phrase to each value or parameter in the string of values or parameters. For example, a statement that the weight percent of oxygen can be less than 1%, 0.5%, or 0.1% is meant to mean that the weight percent of oxygen can be less than 1%, less than 0.5%, or less than 0.1%.

This application discloses several numerical ranges in the text and figures. The numerical ranges disclosed support ranges or values within the disclosed numerical ranges, even though a precise range limitation is not stated verbatim in the specification, since this disclosure can be practiced throughout the disclosed numerical ranges.

The above description is presented to enable a person skilled in the art to make and use the disclosure. Various modifications to the embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred to in this application is hereby incorporated herein by reference.

REFERENCES

[1] Guo, Chun Xian, and Chang Ming Li. "A self-assembled hierarchical nanostructure comprising carbon spheres and graphene nanosheets for enhanced supercapacitor performance." Energy & Environmental Science 4.11 (2011): 4504-4507.
[2] Cheng, Qian, et al. "Graphene and carbon nanotube composite electrodes for supercapacitors with ultra-high energy density." Physical Chemistry Chemical Physics 13.39 (2011): 17615-17624.
[3] Wang, Guoxiu, et al. "Sn/graphene nanocomposite with 3D architecture for enhanced reversible lithium storage in lithium ion batteries." Journal of Materials Chemistry 19.44 (2009): 8378-8384.
[4] Ariga, Katsuhiko, et al. "Nanoarchitectonics for mesoporous materials." Bulletin of the Chemical Society of Japan 85.1 (2012): 1-32.
[5] Garlof, Svenja, et al. "3D carbon networks and their polymer composites: Fabrication and electromechanical investigations of neat Aerographite and Aerographite-based PNCs under compressive load." Carbon 111 (2017): 103-112.
[6] Mecklenburg, Matthias, et al. "Aerographite: ultra lightweight, flexible nanowall, carbon microtube material with outstanding mechanical performance." Advanced Materials 24.26 (2012): 3486-3490.
[7] Smart, Simon K., et al. "Shortened double-walled carbon nanotubes by high-energy ball milling." International Journal of Nanotechnology 4.5 (2007): 618-633.
[8] Pierard, Nathalie, et al. "Method for the production of functionalised short carbon nanotubes and functionalised short carbon nanotubes obtainable by said method." U.S. Pat. No. 7,419,650. 2 Sep. 2008.
[9] Castillejos, Eva, et al. "An efficient strategy to drive nanoparticles into carbon nanotubes and the remarkable effect of confinement on their catalytic performance." Angewandte Chemie 121.14 (2009): 2567-2571.
[10] Van Tuan, Dinh, et al. "Insulating behavior of an amorphous graphene membrane." Physical Review B 86.12 (2012): 121408.
[11] Carpenter, Corinne, Dimitrios Maroudas, and Ashwin Ramasubramaniam. "Mechanical properties of irradiated single-layer graphene." Applied Physics Letters 103.1 (2013): 013102.
[12] Mortazavi, Bohayra, et al. "Amorphized graphene: A stiff material with low thermal conductivity." Carbon 103 (2016): 318-326.
[13] Choi, Young-Kuk, et al. "Processing and characterization of epoxy nanocomposites reinforced by cup-stacked carbon nanotubes." Polymer 46.25 (2005): 11489-11498.
[14] Dittanet, Peerapan. "Fracture behavior of silica nanoparticle filled epoxy resin." (2011).
[15] Lee, Ki Rak, et al. "Electrochemical oxygen reduction on nitrogen doped graphene sheets in acid media." Electrochemistry Communications 12.8 (2010): 1052-1055.
[16] Manufacturer's data sheet.
[17] Vilian, A T Ezhil, et al. "Pt—Au bimetallic nanoparticles decorated on reduced graphene oxide as an excellent electrocatalysts for methanol oxidation." Synthetic Metals 219 (2016): 52-59.
[18] Characterization of xGnP®. Grade C Materials.
[19] Son, In Hyuk, et al. "Silicon carbide-free graphene growth on silicon for lithium-ion battery with high volumetric energy density." Nature communications 6 (2015).
[20] Gojny, Florian H., and Karl Schulte. "Functionalisation effect on the thermo-mechanical behaviour of multi-wall carbon nanotube/epoxy-composites." Composites Science and Technology 64.15 (2004): 2303-2308.
[21] Wagner, H. D., et al. "Stress-induced fragmentation of multiwall carbon nanotubes in a polymer matrix." Applied physics letters 72.2 (1998): 188-190.

The invention claimed is:
1. A liquid dispersion made by a process comprising:
  forming multicellular networks having a diameter of 1,000 μm or smaller by:
    at a temperature of 1100° C. or less, in the presence of a powder of template particles, forming carbon shells, each of the carbon shells generally encapsulating a template particle and together with the encapsulated template particle comprising a heterostructure, the heterostructure comprising:
      a particle diameter of 1,000 μm or smaller; and
      a morphology of interconnected structural subunits and, between
      the structural subunits, exohedral pores; and
    exposing the heterostructures to a first liquid to remove the encapsulated template particles from the carbon shells, the removing of the template particles creating an endohedral pore space within the carbon shells and forming multicellular networks, each multicellular network comprising interconnected cellular subunits and, between the cellular subunits, exohedral pores, a plurality of the cellular subunits comprising:
  a cell wall comprising a portion of the carbon shell and having a thickness of 10 nm or smaller; and
  an endohedral cavity comprising a portion of the endohedral pore space and having a diameter of 1,000 nm or smaller; and
dispersing the multicellular networks in a second liquid, the second liquid comprising a liquid matrix and at least one of a monomer, resin, prepolymer, polymer, curing agent, and catalyst.

2. The dispersion of claim 1, wherein the process further comprises:
calcining a powder at a temperature above 300° C. to form the powder of template particles.

3. The dispersion of claim 2, wherein the process further comprises:
physically altering a plurality of the multicellular networks by deforming the cell walls of a portion of their cellular subunits.

4. The dispersion of claim 3, wherein a Raman spectrum of the multicellular networks under 532 nm excitation comprises an $I_{2D}/I_G$ ratio of less than 0.20 and an $I_T/I_G$ ratio between 0.10 and 0.50.

5. The dispersion of claim 4, wherein a Raman spectrum of the multicellular networks under 532 nm excitation comprises an $I_D/I_G$ ratio of less than 1.50.

6. The dispersion of claim 5, wherein the specific surface area of the multicellular networks is greater than 150 m²/g.

7. The dispersion of claim 6, wherein the thermogravimetric mass loss of the multicellular networks under flowing argon and a heating rate of 10° C./min is at least 5%.

8. The dispersion of claim 7, wherein the carbon shells generally encapsulating the template particles are formed by chemical vapor deposition on surfaces of the template particles at a temperature less than 800° C.

9. The dispersion of claim 1, wherein the process further comprises:
attaching chemical functional groups to the cell walls.

10. The dispersion of claim 1, wherein the first liquid and the second liquid are the same.

11. A composite material made by a process comprising:
forming multicellular networks having a diameter of 1,000 μm or smaller by:
  at a temperature of 1100° C. or less, in the presence of a powder of template particles, forming carbon shells, each of the carbon shells generally encapsulating a template particle and together with the encapsulated template particle comprising a heterostructure, the heterostructure comprising:
    a particle diameter of 1,000 μm or smaller; and
    a morphology of interconnected structural subunits and, between the structural subunits, exohedral pores; and
  exposing the heterostructures to a first liquid to remove the encapsulated template particles from the carbon shells, the removing of the template particles creating an endohedral pore space within the carbon shells and forming multicellular networks, each multicellular network comprising
    interconnected cellular subunits and, between the cellular subunits, exohedral pores, a plurality of the cellular subunits comprising:
      a cell wall comprising a portion of the carbon shell and having a thickness of 10 nm or smaller; and
      an endohedral cavity comprising a portion of the endohedral pore space and having a diameter of 1,000 nm or smaller; and
dispersing the multicellular networks in a second liquid, the second liquid comprising a liquid matrix and at least one of a monomer, resin, prepolymer, polymer, curing agent, and catalyst; and
hardening the liquid matrix to form a solid matrix within which the multicellular networks are embedded.

12. The composite material of claim 11, wherein the process further comprises:
calcining a powder at a temperature above 300° C. to form the powder of template particles.

13. The composite material of claim 12, wherein the process further comprises:
physically altering a plurality of the multicellular networks by deforming the cell walls of a portion of their cellular subunits.

14. The composite material of claim 13, wherein a Raman spectrum of the multicellular networks under 532 nm excitation comprises an $I_{2D}/I_G$ ratio of less than 0.20 and an $I_T/I_G$ ratio between 0.10 and 0.50.

15. The composite material of claim 14, wherein a Raman spectrum of the multicellular networks under 532 nm excitation comprises an $I_D/I_G$ ratio of less than 1.50.

16. The composite material of claim 15, wherein the specific surface area of the multicellular networks is greater than 150 m²/g.

17. The composite material of claim 16, wherein the thermogravimetric mass loss of the multicellular networks under flowing argon and a heating rate of 10° C./min is at least 5%.

18. The composite material of claim 17, wherein the carbon shells generally encapsulating the template particles are formed by chemical vapor deposition on surfaces of the template particles at a temperature less than 800° C.

19. The composite material of claim 11, wherein the process further comprises:
attaching chemical functional groups to the cell walls.

20. The composite material of claim 11, wherein the multicellular networks comprise at least one of:
a reinforcing phase of the composite material, causing the composite material to possess an increased strength relative to a baseline strength possessed by a control material, the control material consisting of a bulk material substantially identical in composition to a bulk phase of the composite material's solid matrix; and
a reinforcing phase of the composite material, causing the composite material to possess an increased modulus relative to a baseline modulus possessed by a control material, the control material consisting of a bulk material substantially identical in composition to a bulk phase of the composite material's solid matrix; and
a reinforcing phase of the composite material, causing the composite material to possess an increased toughness relative to a baseline toughness possessed by a control material, the control material consisting of a bulk material substantially identical in composition to a bulk phase of the composite material's solid matrix; and
an electrically conductive phase of the composite material, causing the composite material to possess an increased electrical conductivity relative to a baseline electrical conductivity possessed by a control material, the control material consisting of a bulk material substantially identical in composition to a bulk phase of the composite material's solid matrix.

\* \* \* \* \*